(12) United States Patent
Shadmon et al.

(10) Patent No.: US 7,143,394 B1
(45) Date of Patent: Nov. 28, 2006

(54) ANALYZING SOFTWARE BEHAVIOR

(75) Inventors: David Shadmon, Brookline, MA (US); Peter Kamvysselis, Boston, MA (US); Yakov Yazlovitsky, Worcester, MA (US); Alexander Gutman, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 606 days.

(21) Appl. No.: 10/034,854

(22) Filed: Dec. 21, 2001

(51) Int. Cl.
*G06F 9/44* (2006.01)
(52) U.S. Cl. ...................... 717/130; 712/227
(58) Field of Classification Search ............. 717/124, 717/130; 712/226; 714/44
See application file for complete search history.

(56) References Cited

U.S. PATENT DOCUMENTS

| | | | | |
|---|---|---|---|---|
| 5,784,554 A | * | 7/1998 | Hsiung | 714/45 |
| 5,960,198 A | * | 9/1999 | Roediger et al. | 717/130 |
| 6,006,033 A | * | 12/1999 | Heisch | 717/158 |
| 6,161,216 A | * | 12/2000 | Shagam | 717/128 |
| 6,374,369 B1 | * | 4/2002 | O'Donnell | 714/38 |
| 6,397,379 B1 | * | 5/2002 | Yates et al. | 717/140 |
| 6,728,949 B1 | * | 4/2004 | Bryant et al. | 717/127 |
| 6,754,890 B1 | * | 6/2004 | Berry et al. | 717/128 |
| 2004/0015930 A1 | * | 1/2004 | Wu | 717/158 |

FOREIGN PATENT DOCUMENTS

WO   WO 200041078 A1 *   7/2000

OTHER PUBLICATIONS

Paul Hughes, "Lifting the Lid," Summer 2001 [online] accessed Mar. 9, 2005, Retrieved from Internet <URL: http://www.neon.co.uk/campus/articles/arm/arm%20summer%2001.htm>, 2 pages.*

* cited by examiner

*Primary Examiner*—Tuan Dam
*Assistant Examiner*—Eric B. Kiss
(74) *Attorney, Agent, or Firm*—Krishnendu Gupta; Penelope S. Wilson

(57) ABSTRACT

Software behavior is analyzed. A disk drive controller has a processor executing computer software stored in a memory communicating with the processor via a local bus. In the controller, computer executable program code is identified that includes a set of computer executable program instructions for recording analytical data for at least a subset of the computer executable program code. The set of computer executable program instructions is disabled from executing. Without halting execution of the computer executable program code, execution of the set of computer executable program instructions is enabled.

33 Claims, 41 Drawing Sheets

```
LOCATE_AT(PROFILE_DATA_area)
EXTERN T_SYMPROF_TABLE_ENTRY symprof_stat_table [SYMPROF_MAX_TABLE_ENTRIES];
END_LOCATION LOCATE_AT(LCLMM_SYM_PROFILER)
EXTERN T_PROFILER_SETUP_RECORD         profilerSetupTable [PROFILER_RANGES_Q];
EXTERN TCO_PROFILER_RUNTIME_INFO       runtimeInfo;
EXTERN ULONG                           symprof_stack_index;    /* index into the profiler stack frame */
EXTERN TCO_SYMPROF_STACK_FRAME         symprof_stack_base [MAX_NUMBER_OF_SYM_PROF_STACK_FRAMES];
END_LOCATION typedef enum
{
    PROFILER_MODE_UNDEFINED = 0,
    PROFILER_MODE_PROFILING = 1,
    PROFILER_MODE_TRACING   = 2,
    PROFILER_MODE_ONCE      = 3
} T_PROFILER_MODE;
```

FIG. 3

T_SYMPROF_TABLE_ENTRY ⟶ 310

| MSB | | | | | LSB |
|---|---|---|---|---|---|
| FUNCTION ADDRESS (32 BITS) 312 | NUMBER OF CALLS (64 BITS) 318 | TOTAL TIME (64 BITS) 316 | SELF TIME (64 BITS) 314 | PROFILER INSTRUCTION ADDRESS (32 BITS) 320 | |

FIG. 4

Original program code

BOOLEAN update_restored_ckd_id_table(T_DV_REC *p_dv)
{
    stwu %r1,-16(%r1)
    mflr %r0
    stw %r31,12(%r1)
    stw %r0,20(%r1)
    mr %r31,%r3

With Profiler code:

```
BOOLEAN update_restored_ckd_id_table(T_DV_REC *p_dv)
{
    stwu %r1,-16(%r1)
    mflr %r0
    stw %r31,12(%r1)
    stw %r0,20(%r1)
    .section ".bss1"
    .align 2
    .long 0
    .long 0
    .long 0
    .long 0
    .long 0
    .long 0
    .long 0
    .long 0
    .section ".text"
    b .+8        <<--  Replaced by "bla _mcount" when profiling enabled
    .long .LP0
    mr %r31,%r3
```

510

```
void profiler_entry (T_SYMPROF_TABLE_ENTRY* self_entry, ULONG* params_p)
{
    UINT64 time_now = getTimeBase(); /* Take a snapshot of the current time */

/* Stop the profiler if we are over the time limit */
    if (runtimeInfo.timeLimit &&
        ((cu_timer - runtimeInfo.startTime) > runtimeInfo.timeLimit))
    {
        /* Over the time limit - stop the profiler */
        BIT_CLEAR(B_SYMPROF_ON, runtimeInfo.flags);
        runtimeInfo.stopTime = cu_timer;
    }

/* Start the timer for the function being profiled (self) and reset the
       self total time */
    symprof_stack_base [symprof_stack_index].entry_time   = time_now;
    symprof_stack_base [symprof_stack_index].reentry_time = time_now;
    symprof_stack_base [symprof_stack_index].self_time    = 0;

/* Set the index to which this stack frame refers */
    symprof_stack_base [symprof_stack_index].table_entry = (ULONG) self_entry;
```

FIG. 8A

```
/* Stop the timer of the parent function (parent) */
if (symprof_stack_index != 0)
{
    /* We are not at top level of the profiler stack - compute the total
       time spent in the parent since last reentry to the parent */ symprof_stack_base[symprof_stack_index-1].self_time +=
        time_now - symprof_stack_base[symprof_stack_index-1].reentry_time;
}

/* Increment self counter */
self_entry->calls++;

/* Push self stack frame on profiler stack, check for overflow */
if (++symprof_stack_index >= MAX_NUMBER_OF_SYM_PROF_STACK_FRAMES)
{
    /* Profiler stack overflow: disable profiling */
    BIT_CLEAR(B_SYMPROF_ON, runtimeInfo.flags);
    runtimeInfo.stopTime = cu_timer;
} if (runtimeInfo.mode == PROFILER_MODE_TRACING)
{
    traceRoutineEntry (self_entry->functionAddr, params_p);
}

| FIG. 9A | FIG. 9B |
|---------|---------|

FIG. 9

```
void profiler_exit (ULONG* params_p)
{
T_SYMPROF_TABLE_ENTRY* self_entry;
UINT64 time_now = getTimeBase (); /* Take a snapshot of the current time */

/* Pop the calling function's stack frame from profiler's stack */
symprof_stack_index--;

/* Update the re-entry time of the parent function */
if (symprof_stack_index != 0)
{
    /* We are not at top level of the profiler stack - store the reentry
       time of the parent function */
    symprof_stack_base [symprof_stack_index-1].reentry_time = time_now;
}

/* Don't update the entry if the profiler is off */
if (BIT_IS_CLEAR(B_SYMPROF_ON, runtimeInfo.flags))
{
    return;
}
```

FIG. 9A

```
/* Update the current function's profiler table entry */
self_entry = (T_SYMPROF_TABLE_ENTRY *)
    symprof_stack_base[symprof_stack_index].table_entry;

self_entry->self_time +=
    TimeBase2Micros(time_now -
symprof_stack_base[symprof_stack_index].reentry_time +
                    symprof_stack_base[symprof_stack_index].self_time);

self_entry->total_time +=
    TimeBase2Micros(time_now -
symprof_stack_base[symprof_stack_index].entry_time);

if (runtimeInfo.mode == PROFILER_MODE_TRACING)
{
    traceRoutineExit (self_entry->functionAddr, params_p);
} if (runtimeInfo.mode == PROFILER_MODE_ONCE)
{ /* Disable profiling by replacing "bla mcount" with "br .+8" */
    insertInstruction ((ULONG *)self_entry->profilerInstructionAddr,
PPC_B_LOCATION_PLUS_8_INSTR);
}
}
```

FIG. 9B

1210 RECORD CURRENT TIME

1220 STOP PROFILING IF TIME EXPIRED (IF PROFILING ACTIVATED WITH TIME LIMIT OPTION)

1230 INITIALIZE ENTRY AND RE-ENTRY TIMES

1240 RESET TOTAL SELF-TIMER

1250 SET STACK INDEX FOR PROFILED FUNCTION

1260 HALT TIMER FOR PARENT FUNCTION

1270 INCREMENT CALLS COUNTER FOR PROFILED FUNCTION

1280 PUSH SELF STACK FRAME ONTO PROFILER STACK

1290 RECORD FUNCTION ADDRESS AND PARAMETERS (IF EXECUTING IN "TRACE" MODE)

FIG. 12

```
UTILITY 83 -- Sym-Profiler : TIME: SEP/30/01 18:13:37
─────────────────────────────────────────────────────

83, [HELP | AAAA], [STUP | EXEC | DISP] - Display help page
                    STUP - Setup
                    EXEC - Runtime control
                    DISP - Display statistics P in prompt - Profiler in ON
Event trace message: 0xd3
```

FIG. 16A

```
UTILITY 83 -- Sym-Profiler : TIME: SEP/30/01 18:16:4
─────── Profiler Setup ───────
83,DEF,<range number>,<start-addr>,<end-addr>,<flags>
    Add to <flags>: 0x1 - symbolic addr range
                    0x2 - multi-module range, p6 and p7 = name of end module
83,[C | D | E],<ranges bitmap>  - Clear, Disable, Enable ranges per bitmap
83,EE                           - Restore setup from NVD
83,DD,<start range>,<flags>     - Display profiler setup
    Add to <flags>: 0x1 - display from NVD
83,DRAW,<ranges bitmap>,<flags> - Display profiler setup in raw mode
    Add to <flags>: 0x1 - display from NVD
```

FIG. 16B

```
UTILITY 83 -- Sym-Profiler : TIME: SEP/30/01 18:19:0
                Profiler Execution
83,CA              - Clear profiler statistics
83,1,<mode>,[<time>]  - Start profiling (optionally stop after <time> seconds)
    <mode>  TRAC - Tracing
            PROF - Profiling
            ONCE - Do once then disable (per function)
83,0               - Stop profiling
```

FIG. 16C

```
UTILITY 83 -- Sym-Profiler : TIME: SEP/30/01 18:20:1
--------------- Profiler Display ---------------
83,A,<skip>,<lines>,<key>,<order> - Display statistics
<skip>  - Number of entries to skip before starting display
<lines> - Number of lines to display in page (default is 16)

<key>='CALL' - Rank statistics by number of calls
      'SELF' - Rank statistics by function time alone (no descendant time)
      'TOTL' - Rank statistics by total function time
      'SEAV' - Rank statistics by function time (average)
      'TOAV' - Rank statistics by total function time (average)
<order>= [ASCE | DESC] - Rank statistics in ascending/descending order
83,AF,0,<function address> - Display statistics for one function
83,AF,1,<module-name>,<module-name>,<offset>  specify function as
module+offset
83,AF,1,<module-name>,<module-name>,1 - Display statistics for all functions
in module
83,AA,<ranges bitmap>  - Display all functions in range
83,A0,<ranges bitmap>  - Display functions in range which were not called
83,A1,<ranges bitmap>  - Display functions in range which were     called
```

FIG. 16D

DA- 16a : S5 IMPL MONITOR > 83,1,50524F4

UTILITY 83 -- Sym-Profiler : TIME: OCT/01/01 11:06:59
─────────────────────────────

Profiler is ON, Mode: Profiling, Setup time: OCT/01/01 11:04:02

| No. | Range | | | Found | Functions | | Statistics table | |
|---|---|---|---|---|---|---|---|---|
| | Start | End | | | First | Last | First | Last |
| *01. | unzip_ld+00000 100000 | sfs_vnop+133e8 | 500000 | 1035 | 00260a5c | 004c5088 | 008d0000 | 008d8140 |

Runtime information:
Start time: OCT/01/01 11:06:59; Stop time: _____
Runtime limit: No limit

FIG. 17

```
DA- 16a : PS5 IMPL MONITOR > 83,0

UTILITY 83 -- Sym-Profiler : TIME: OCT/01/01 11:01:11
_____

Profiler: OFF

Start time: 10:56:01 OCT/01/01 0a587783
Stop  Time: 11:01:11 OCT/01/01 0a5879ee
Run Time  : 0d 00h 05m 09s
```

FIG. 18

DA- 16a : PS5 IMPL MONITOR > 83,A

UTILITY 83 -- Sym-Profiler : TIME: OCT/01/01 11:14:37

Profiler: ON, MODE: Profiling

Start time: 11:06:59 OCT/01/01 0a587ca6
Run Time  : 0d 00h 07m 38s

| Routine Module/Offset | Address | Number of Drawings | Time (micros) | | Average time (micros) | | % time | |
|---|---|---|---|---|---|---|---|---|
| | | | Self | Total | Self | Total | Self | Total |
| thermal_+00170 | 49e22c | 1 | 87911 | 87911 | 87911 | 87911 | 0 | 0 |
| thermal_+001a0 | 49e25c | 4 | 57332 | 57332 | 14333 | 14333 | 0 | 0 |
| thermal_+00004 | 49e0c0 | 3 | 483 | 483 | 161 | 161 | 0 | 0 |

Min stack pointer = 0082fba8 at 0049e0c0, stack available = 0002fba8 bytes

FIG. 19A

| FIG. 19B-1 |
|---|
| FIG. 19B-2 |

UTILITY 83 -- Sym-Profiler : TIME: OCT/01/01 14:54:30

Profiler: ON, MODE: Profiling

Start time: 14:54:23 OCT/01/01 0a58e73e
Run Time  : 0d 00h 00m 07s

| Routine Module/Offset | Address | Number of Drawings | Time (micros) Self | Time (micros) Total | Average time (micros) Self | Average time (micros) Total | % time Self | % time Total |
|---|---|---|---|---|---|---|---|---|
| daschedu+01cc0 | 3641d0 | 44501 | 226182 | 5145138 | 5 | 115 | 3 | 73 |
| daschedu+00ad8 | 362fe8 | 32752 | 98552 | 3948230 | 3 | 120 | 1 | 56 |
| dawrites+00004 | 267ec0 | 32752 | 1593660 | 3849616 | 48 | 117 | 22 | 54 |
| dawrites+016c0 | 26957c | 127683 | 1400634 | 2053441 | 10 | 16 | 20 | 29 |
| dawrites+012d0 | 26918c | 488521 | 515448 | 605265 | 1 | 1 | 7 | 8 |
| daschedu+01048 | 363558 | 46165 | 402229 | 467912 | 8 | 10 | 5 | 6 |
| daschedu+01598 | 363aa8 | 44501 | 205113 | 455331 | 4 | 10 | 2 | 6 |
| daschedu+007dc | 362cec | 11804 | 19880 | 447482 | 1 | 37 | 0 | 6 |
| daprefch+03788 | 2641d0 | 11804 | 23263 | 429399 | 1 | 36 | 0 | 6 |
| daprefch+01d0c | 262754 | 11804 | 74382 | 376237 | 6 | 31 | 1 | 5 |
| daprefch+01fa8 | 2629f0 | 46916 | 283656 | 309941 | 6 | 6 | 4 | 4 |
| daschedu+00004 | 362514 | 44501 | 173907 | 205722 | 3 | 4 | 2 | 2 |
| da_utils+02858 | 2f1468 | 44339 | 163917 | 163917 | 3 | 3 | 2 | 2 |
| dawrites+00dd4 | 268c90 | 133836 | 133836 | 133836 | 1 | 1 | 1 | 1 |
| dawrites+00728 | 2685e4 | 41789 | 124541 | 125498 | 2 | 3 | 1 | 1 |
| daschedu+00e04 | 363314 | 2521 | 109413 | 109413 | 43 | 43 | 1 | 1 |

Min stack pointer = 0082f260 at 0026c4f4, stack available = 0002f260 bytes

DA- 2a : P@sS5 DISK SUBSYSTEM: >

Set-Up-Time: OCT/01/01 14:56:17    Stop-Trigger: FFFFFFFF    Phase: COLLECT
Collect-Time: OCT/01/01 14:56:17    GM Reject: 0(0)/0
Util 97 Info - Setup Time: OCT/01/01 13:22:25

DONE.
DA- 2a : P.sS5 DISK SUBSYSTEM:>

FIG. 19B-2

Util_end: 00000000 msgid=552905
10/01/01 15:22:06  15b -> PC (Unknown)

Util_end: 00000000 msgid=CEFABEBA
10/01/01 15:22:06  01a -> PC (Unknown)

Util_end: 00000000 msgid=CEFABEBA
10/01/01 15:22:06  15a -> PC (Unknown)

Util_end: 00000000 msgid=CEFABEBA
10/01/01 15:22:06  01b -> PC (Unknown)

Util_end: 00000000 msgid=CEFABEBA
10/01/01 15:22:06  16a -> PC (Unknown)

Util_end: 00000000 msgid=CEFABEBA
10/01/01 15:22:06  16d -> PC (Unknown)

Util_end: 00000000 msgid=CEFABEBA
10/01/01 15:22:06  16b -> PC (Unknown)

Util_end: 00000000 msgid=CEFABEBA
10/01/01 15:22:06  16c -> PC (Unknown)

Util_end: 00000000 msgid=CEFABEBA
10/01/01 15:23:03  02b -> PC (Unknown)

OCT/01/01 14:57:17 CONTROL STORE TEST...01 add(00080000) ........PASSED.

DA- 2b : .sS5 DISK SUBSYSTEM:>
10/01/01 15:23:20  01b -> PC (Unknown)

OCT/01/01 14:57:34 CONTROL STORE TEST...01 add(00080000) ........PASSED.

DA- 1b : .sS5 DISK SUBSYSTEM:>
10/01/01 15:24:03  01a -> PC (Unknown)

| FIG. 19D-1 |
| FIG. 19D-2 |

DA- 1a : .sS5 DISK SUBSYSTEM:>
10/01/01 15:26:48  02b -> PC (Unknown)
ptErrorResp [85.5F16.06] at 10/01/2001 3:26:48 PM
10/01/01 15:26:48  01a -> PC (Unknown)

DA- 1a : .sS5 DISK SUBSYSTEM:>
10/01/01 15:30:09  Manual Inlines command sent: 83,A
10/01/01 15:30:09  PC (INLINES) -> 02a,,, Command to dir 02a: [83,A,] msgid=552A05
10/01/01 15:30:09  02a -> PC (INLINES)

UTILITY 83 -- Sym-Profiler : TIME: OCT/01/01 15:04:23

Profiler:  ON, MODE: Profiling

Start time: 14:54:23 OCT/01/01 0a58e73e
Run Time  : 0d 00h 10m 00s

FIG. 19D-1

| Routine Module/Offset | Address | Number of Drawings | Time (micros) Self | Time (micros) Total | Average time (micros) Self | Average time (micros) Total | % time Self | % time Total |
|---|---|---|---|---|---|---|---|---|
| daschedu+01cc0 | 3641d0 | 2522952 | 12991240 | 329169241 | 5 | 130 | 2 | 54 |
| daschedu+00ad8 | 362fe8 | 2055489 | 6183238 | 262200235 | 3 | 127 | 1 | 43 |
| dawrites+00004 | 267ec0 | 2055489 | 109371204 | 256003627 | 53 | 124 | 18 | 42 |
| dawrites+016c0 | 26957c | 6998173 | 85742065 | 126349753 | 12 | 18 | 14 | 21 |
| dawrites+012d0 | 26918c | 31979335 | 30528363 | 34969248 | 0 | 1 | 5 | 5 |
| daschedu+01048 | 363558 | 2685627 | 24248920 | 28323741 | 9 | 10 | 4 | 4 |
| daschedu+01598 | 363aa8 | 2522952 | 11494217 | 26585146 | 4 | 10 | 1 | 4 |
| da_copyt+02970 | 37b428 | 2652 | 35059 | 14419079 | 13 | 5437 | 0 | 2 |
| daschedu+0007dc | 362cec | 387932 | 702492 | 13111048 | 1 | 33 | 0 | 2 |
| daschedu+00004 | 362514 | 2522952 | 10933652 | 12611157 | 4 | 4 | 1 | 2 |
| daprefch+03788 | 2641d0 | 387932 | 820965 | 12478041 | 2 | 32 | 0 | 2 |
| daprefch+01d0c | 262754 | 387932 | 2333514 | 11458184 | 6 | 29 | 0 | 1 |
| daschedu+00828 | 362d38 | 54643 | 363880 | 10799259 | 6 | 197 | 0 | 1 |
| daschedu+00a10 | 362f20 | 7919 | 812005 | 10421421 | 102 | 1316 | 0 | 1 |

FIG. 19D-2

```
da_rtask+00004 373224|    3503|   50487|  9518913|     14|   2717|  0|  1|
dawrites+00728 2685e4|  2723405| 9344426| 9422713|      3|      3|  1|  1|
```
Min stack pointer = 00825370 at 002a6450, stack available = 00025370 bytes DA- 2a : P.sS5 DISK SUBSYSTEM:>
Util_end: 00000000 msgid=552A05
10/01/01 15:31:47  15a -> PC (Unknown)

OCT/01/01 15:06:01  CONTROL STORE TEST...01 add(00080000) ........PASSED.
10/01/01 15:32:03  16a -> PC (Unknown)

OCT/01/01 15:06:17  CONTROL STORE TEST...01 add(00080000) ........PASSED.
10/01/01 15:33:55  15b -> PC (Unknown)

OCT/01/01 15:08:09  CONTROL STORE TEST...01 add(00080000) ........PASSED.
10/01/01 15:34:01  02a -> PC (INLINES)
ptErrorResp [85.5F16.06] at 10/01/2001 3:34:01 PM
10/01/01 15:34:01  01a -> PC (Unknown)

DA- 1a : .sS5 DISK SUBSYSTEM:>
10/01/01 15:34:17  16b -> PC (Unknown)

OCT/01/01 15:08:31  CONTROL STORE TEST...01 add(00080000) ........PASSED.
10/01/01 15:34:58  Closing Inlines
10/01/01 15:35:03  Opening Inlines, user: , group: PC group
10/01/01 15:35:17  Manual Inlines command sent: 83,AAAA
10/01/01 15:35:17  PC (INLINES) -> 01a,,, Command to dir 01a: [83,AAAA,] msgid=552C05
10/01/01 15:35:17  01a -> PC (INLINES)

UTILITY 83 -- Sym-Profiler : TIME: OCT/01/01 15:09:31
---

83, [HELP | AAAA], [STUP | EXEC | DISP] - Display help page
       STUP - Setup

FIG. 19E

EXEC - Runtime control
DISP - Display statistics

P in prompt - Profiler in ON
Event trace message: 0xd3

DA- 1a : .sS5 DISK SUBSYSTEM:>
Util_end: 00000000 msgid=552C05
10/01/01 15:35:22 Manual Inlines command sent: .
10/01/01 15:35:22 PC (INLINES) -> 01b,,.

Command to dir 01b: . msgid=552D05
10/01/01 15:35:22 01b -> PC (INLINES)

NON HEX CHAR

DA- 1b : .sS5 DISK SUBSYSTEM:>
10/01/01 15:35:26 Manual Inlines command sent: .
10/01/01 15:35:26 PC (INLINES) -> 02a,,.

Command to dir 02a: . msgid=552E05
10/01/01 15:35:26 02a -> PC (INLINES)

NON HEX CHAR

DA- 2a : P.sS5 DISK SUBSYSTEM:>
10/01/01 15:35:31 Manual Inlines command sent: 83,A
10/01/01 15:35:31 PC (INLINES) -> 02a,,.

```
Command to dir 02a: [83,A,] msgid=552F05
10/01/01 15:35:32  02a -> PC (INLINES)

UTILITY 83 -- Sym-Profiler : TIME: OCT/01/01 15:09:45
_____
Profiler:  ON, MODE: Profiling
```

FIG. 19F

Start time : 14:54:23 OCT/01/01 0a58e73e
Run Time  : 0d 00h 15m 22s

| Routine Module/Offset | Address | Number of Drawings | Time (micros) Self | Time (micros) Total | Average time (micros) Self | Average time (micros) Total | % time Self | % time Total |
|---|---|---|---|---|---|---|---|---|
| daschedu+01cc0 | 3641d0 | 40485572 | 211154575 | 494195505 | 5 | 122 | 2 | 53 |
| daschedu+00ad8 | 362fe8 | 32913389 | 9902877 | 385479049 | 3 | 117 | 1 | 41 |
| dawrites+00004 | 267ec0 | 32913389 | 1581197598 | 375574540 | 48 | 114 | 17 | 40 |
| dawrites+016c0 | 26957c | 97934496 | 1276464078 | 187230604 | 13 | 19 | 13 | 20 |
| dawrites+012d0 | 26918c | 472161195 | 44602356 | 510039823 | 0 | 1 | 4 | 5 |
| daschedu+01048 | 363558 | 4491138 | 40201730 | 46996117 | 8 | 10 | 4 | 5 |
| daschedu+01598 | 363aa8 | 40485572 | 18782025 | 42846503 | 4 | 10 | 2 | 4 |
| da_copyt+02970 | 37b428 | 4805 | 80589 | 21817204 | 16 | 4540 | 0 | 2 |
| daschedu+007dc | 362cec | 7464474 | 13200046 | 21643679 | 1 | 28 | 0 | 2 |
| daprefch+03788 | 2641d0 | 7464474 | 15388576 | 20458191 | 2 | 27 | 0 | 2 |
| daschedu+00004 | 362514 | 40485572 | 17360936 | 19983269 | 4 | 4 | 1 | 2 |
| daprefch+01d0c | 262754 | 7464474 | 3842503 | 18513306 | 5 | 24 | 0 | 2 |
| daschedu+00828 | 362d38 | 94399 | 677156 | 17337392 | 7 | 183 | 0 | 1 |
| da_copyt+020e4 | 37ab9c | 4805 | 1255412 | 17013818 | 261 | 3540 | 0 | 1 |
| daschedu+00a10 | 362f20 | 15427 | 1584969 | 16634358 | 102 | 1078 | 0 | 1 |
| da_rtask+00004 | 373224 | 11742 | 133494 | 16066053 | 11 | 1368 | 0 | 1 |

Min stack pointer = 00823048 at 0049f394, stack available = 00023048 bytes

DA- 2a : P.sS5 DISK SUBSYSTEM:>

FIG. 19G

Profiler: ON, MODE: Profiling

Start time: 14:54:23 OCT/01/01 0a58e73e
Run Time  : 0d 00h 35m 31s

| Routine Module/Offset | Address | Number of Drawings | Time (micros) Self | Time (micros) Total | Average time (micros) Self | Average time (micros) Total | % time Self | % time Total |
|---|---|---|---|---|---|---|---|---|
| dawrites+00004 | 267ec0 | 8159810 | 379921296 | 906208848 | 46 | 111 | 17 | 42 |
| dawrites+016c0 | 26957c | 23194433 | 311286293 | 454524217 | 13 | 19 | 14 | 21 |
| dawrites+012d0 | 26918c | 113817075 | 107355424 | 123512544 | 0 | 1 | 5 | 5 |
| daschedu+01048 | 363558 | 10837699 | 97770758 | 114282199 | 9 | 10 | 4 | 5 |
| daschedu+01cc0 | 3641d0 | 9992748 | 51666137 | 1170386199 | 5 | 117 | 2 | 54 |
| daschedu+01598 | 363aa8 | 9992748 | 46125615 | 103420081 | 4 | 10 | 2 | 4 |
| daschedu+00004 | 362514 | 9992748 | 41495305 | 47383227 | 4 | 4 | 1 | 2 |
| da_utils+02858 | 2f1468 | 9958730 | 37412992 | 37412992 | 3 | 3 | 1 | 1 |
| dawrites+00728 | 2685e4 | 10299487 | 33491913 | 33763773 | 3 | 3 | 1 | 1 |
| daschedu+00e04 | 363314 | 655745 | 28488210 | 28488210 | 43 | 43 | 1 | 1 |
| daprefch+01fa8 | 2629f0 | 4101228 | 24844129 | 27249016 | 6 | 6 | 1 | 1 |
| daschedu+00ad8 | 362fe8 | 8159810 | 24544745 | 930763270 | 3 | 114 | 1 | 43 |
| da_copyt+00100 | 378bb8 | 10118 | 23769100 | 25413369 | 2349 | 2511 | 1 | 1 |
| dawrites+00dd4 | 268c90 | 23484807 | 23485140 | 23485140 | 1 | 1 | 1 | 1 |
| idle_stt+00080 | 394434 | 10995564 | 21948672 | 21948761 | 1 | 1 | 1 | 1 |
| cache_rt+03f04 | 26e8e4 | 2313095 | 19836710 | 23451890 | 8 | 10 | 0 | 1 |

Min stack pointer = 00823048 at 0049f394, stack available = 00023048 bytes

FIG. 20

ANALYZING SOFTWARE BEHAVIOR

BACKGROUND

This application relates generally to analyzing software and more particularly to analyzing software behavior.

Computer systems generally include a central processing unit, a memory system, and a data storage system. An enterprise data storage system (EDSS), such as the SYMMETRIX Enterprise Storage Platform (ESP) by EMC Corp., is a versatile data storage system having the connectivity and functionality to simultaneously provide storage services to different types of host computers (e.g., mainframes and open system hosts). A large number of main, physical storage devices (e.g., an array of disk devices) may be used by an EDSS to provide data storage for several hosts. The EDSS storage system is typically connected to the associated host computers via dedicated cabling or a network. Such a model allows for the sharing of centralized data among many users and also allows a single point of maintenance for the storage functions associated with the many computer systems.

Disk drive systems continue to grow in size and sophistication. These systems can typically include many large disk drive units controlled by a complex, multi-tasking, disk drive controller such as the EMC SYMMETRIX disk drive controller by EMC Corp. A large scale disk drive system can typically receive commands from a number of host computers and can control a number of disk drive mass storage devices.

As these systems increase in complexity, so does the user's reliance upon the systems, for fast and reliable access, recovery, and storage of data. Accordingly, the user typically uses data throughput and speed of response as primary criteria for evaluating performance of the disk drive systems. As a result, mass storage devices and the controllers that drive them have become quite sophisticated in efforts to improve command response time. Systems such as the EMC SYMMETRIX disk drive controller system thus incorporate a large cache memory, and other techniques to improve the system throughput.

As the systems grow in complexity, interrupting failures at either the disk drive or at the controller level become increasingly undesirable. As a result, systems have become more reliable and the mean time between failures continues to increase. Nevertheless, it is more than an inconvenience to the user if the disk drive system goes "down" or off-line; even if the problem is corrected relatively quickly, i.e., within hours. The resulting lost time adversely affects not only system throughput performance, but user application performance. Further, the user is typically not concerned whether it is a physical disk drive, or its controller that fails; it is the inconvenience and failure of the system as a whole that causes user difficulties.

Many disk drive systems, such as the EMS SYMMETRIX disk drive system, rely upon standardized buses to connect the host computer to the controller, and to connect the controller and the disk drive elements. Thus, should the disk drive controller connected to the bus fail, the entire system, as seen by the host computer, may fail and the result is as noted above, unacceptable to the user.

As computer systems become more complex, and as businesses rely more upon their computer systems, any performance problem is troublesome, and a performance problem that requires the system to shut down becomes a major and potentially disastrous event.

A failure of or decrease in input/output behavior in, for example, a memory system, could become a bottleneck to efficiency and throughput in the overall operation of the system. Thus, much effort and customer engineering has been directed to being able to resolve problems that occur in the input/output process. A problem may be addressed by taking over the system having the performance problem, determining precisely where and what the problem is by recreating the problem at the customer site, for example by running the applications and data that led to the problem, and then resolving the problem.

Such methods of problem isolation and correction accordingly require the customer's system to be off-line for a period of time, and further can require intensive customer engineer time at the customer site. Aside from being relatively costly in customer time, this method of solving a performance issue can further adversely affect the customer's operations.

SUMMARY

Software behavior, such as software performance, software calling sequence, or software memory utilization, is analyzed in a disk drive controller that has a processor executing computer software stored in a memory communicating with the processor via a local bus. In at least one aspect of the invention, in the controller, computer executable program code is identified that includes a set of computer executable program instructions for recording analytical data for at least a subset of the computer executable program code. The set of computer executable program instructions is disabled from executing. Without halting execution of the computer executable program code, execution of the set of computer executable program instructions is enabled.

In at least another aspect of the invention, in the controller, analytical software is identified for recording analytical data of software execution, and software source code is identified that does not include the analytical software. Computer executable program code is derived from the software source code and the analytical software. The computer executable program code includes computer executable instructions for recording analytical data for at least a subset of the computer executable program code. The computer executable instructions are inactive and are capable of being activated during execution of the computer executable program code.

In at least another aspect of the invention, computer executable program code is identified that includes at least one computer executable program instruction causing execution of analytical program instructions to be avoided. The analytical program instructions cause recording of analytical data for at least a subset of the computer executable program code. Without halting execution of the computer executable program code, a change is performed directed to the computer executable program instruction to allow execution of the analytical program instructions.

Implementations of the invention may provide one or more of the following advantages. A profiling tool can be provided that operates with little or no overhead and with little or no performance penalty relative to ordinary operation of the profiled program code. Profiling of all or part of a set of program code can be enabled or disabled while the program code is in use. Highly effective profiling can be accomplished in a barebones profiling environment. Profiling analysis can be performed with little or no changes to the profiled program code. Multiple different profiling sessions may be executed rapidly by exercising a user interface to designate portions of program code for profiling. A profiling compatible version of program code can be provided that also serves as a production version of the program code, which can facilitate debugging efforts, particularly where reproducing an identified problem is important or necessary to finding a solution. The program code can be arranged so that only a small layer of profiling program code is added for each function that is rendered accessible to profiling, which can facilitate the efficient use of program storage resources. Statistical information resulting from profiling can be retrieved and displayed at various times, including while the profiled program code is executing. Data resulting from profiling can be retrieved quickly without delays that are typically associated with disk access times.

Other advantages and features will become apparent from the following description, including the drawings, and from the claims.

BRIEF DESCRIPTION OF THE DRAWINGS

FIGS. 3–5 are illustrations of data structures used in the systems of FIGS. 1–2.

FIGS. 6, 10–15 are flow diagrams of procedures used in the systems of FIGS. 1–2.

FIGS. 7–9 are illustrations of program code used in the systems of FIGS. 1–2.

FIGS. 16A–20 are illustrations of user interface presentations used with the systems of FIGS. 1–2.

DETAILED DESCRIPTION

Figure 1:
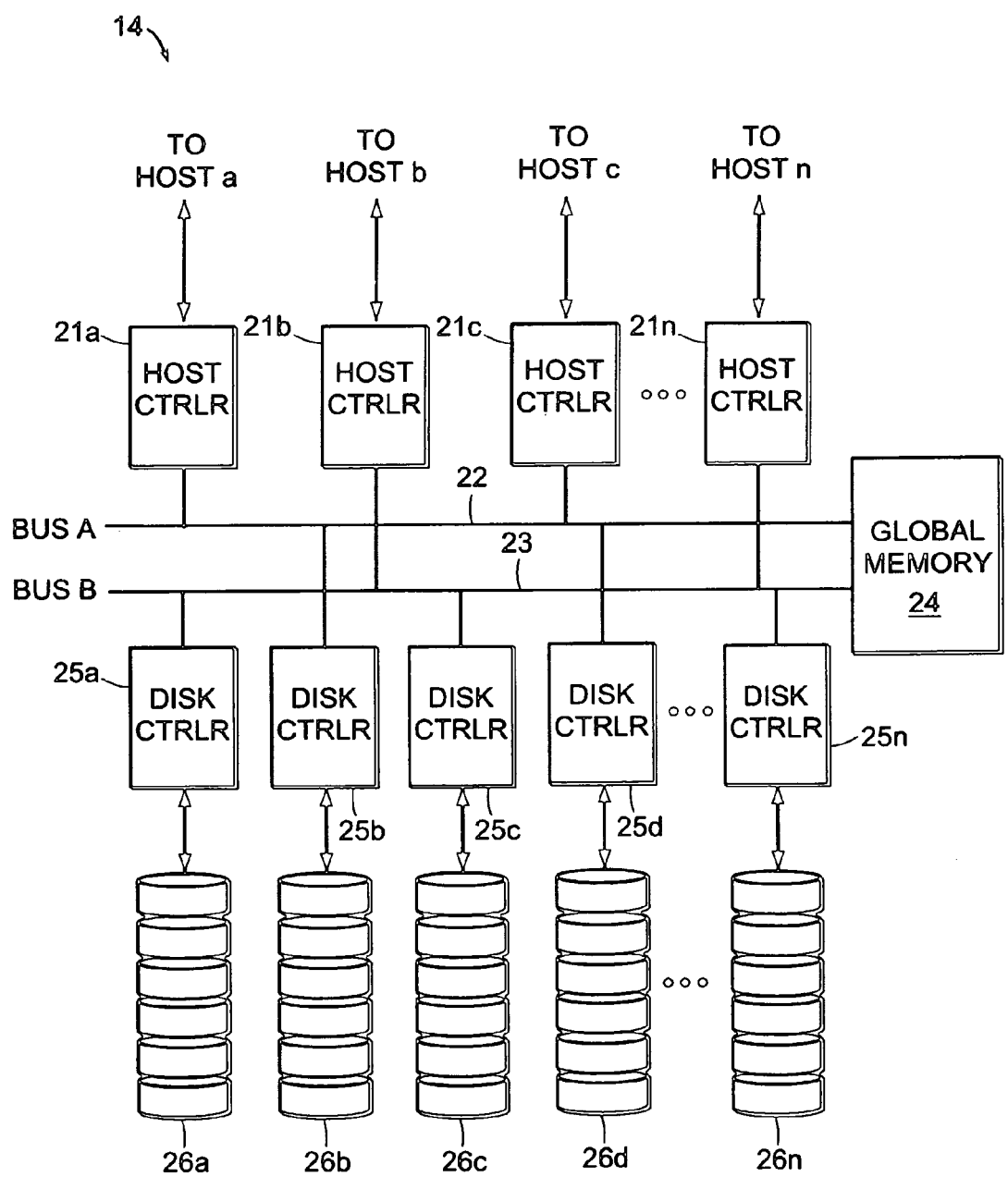
FIGS. 1–2 are block diagrams of computer systems having software behavior analysis.

A "Profiler" system described below provides highly effective software behavior analysis capabilities, particularly in a fault-tolerant, shared bus multi-processor, intelligent mass storage environment that has restrictive timing constraints and that relies on efficient use of computing and data storage resources. In a specific implementation, a small amount of Profiler program code is added to computer software at compile time, which Profiler program code may be modified before or during execution of the computer software to cause execution behavior data (e.g., timing data) to be gathered and recorded for all or a portion of the computer software. As described below, individual functions of the computer software are provided with respective program code headers to allow one or more of the individual functions to be selected or de-selected for behavior analysis ("profiling"), even where a profiled function has a parent function (the function that called the profiled function) or a child function (a function called by the profiled function) or both parent and child functions.

The system can be used for collecting behavior data, program flow information (the sequence of function calls executed by a program), and program code coverage information (log identifying executed functions and unexecuted functions). Such use is helpful during software testing and can be made with minimal disruption to production code. For example, in code coverage mode, profiling is disabled for a particular routine once the routine has been executed, such that the overhead of having profiling enabled is minimal and diminishes with time. Thus, in code coverage mode, each routine is counted once at most, so that, for each routine, the result indicates only whether or not the routine was executed at all.

The gathered execution behavior data is stored in one or more table data structures in which an entry is provided for each profiled function, as described below. The table data structures reside in local semiconductor memory that is accessible at high speed by the local processor, e.g., via a data bus that is used primarily or exclusively for data transfers between the local semiconductor memory and the local processor. Profiling results are derived from the table data structures and are presented to the user, e.g., on a computer screen. Profiling statistics are updated in real time as the profiled functions are executed.

Since individual functions can be selected or de-selected for profiling, the Profiler system can be used in a narrowing, iterative search to help pinpoint the function that is the source of an identified program execution problem, e.g., a program bug causing an excessive delay or improper behavior. For example, in an initial round in the iteration, a broad range of functions can be selected for profiling and analysis, and only increasingly likely candidates are selected in subsequent rounds for profiling and analysis. In particular, when a function having many child functions is identified as a likely candidate source of a problem, the function's child functions may be selected or deselected one by one until the location of the problem is identified more specifically.

Referring first to FIG. 1, a storage system 14 is shown to include a plurality of host controllers 21a–21n which are, according to a specific implementation, coupled alternately to buses 22 and 23. Each host controller 21a–21n is responsible for managing the communication between its associated attached host computers and storage system 14. The host controllers of the preferred embodiment may include one or more central processing units ("CPUs" or "processors"). The controller CPUs operate under program control to manage the flow of data between an associated host computer and the storage system 14.

Also coupled alternately to buses 22 and 23 are a plurality of disk controllers 25a–25n. Controllers 25a–25n are here similar in construction to controllers 21a–21n. That is, each includes at least one CPU configured to operate under control of a program loaded into an associate CPU program memory. Coupled to each disk controller is an array of storage devices which as shown here may be magnetic disk devices. Like the host controllers described above, each disk controller is responsible for managing the communications between its associated array of disk drives and the host controllers or global memory 24 of storage system 14.

Figure 2:
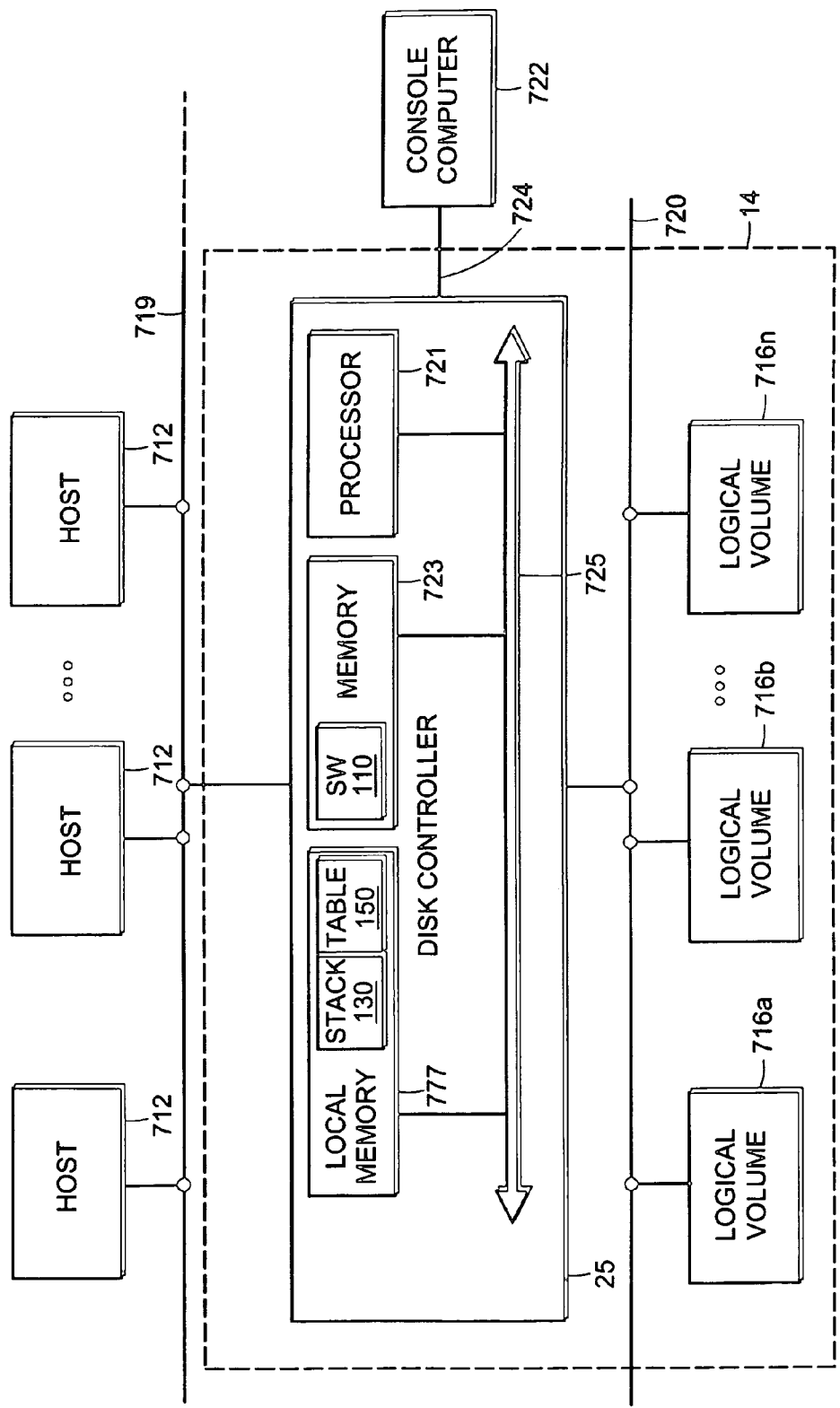

As illustrated in FIG. 2, the storage system 14 may include a plurality of logical volumes 716a, 716b, . . . , 716n. Each logical volume may be representative of one or more physical disk drive elements (e.g., magnetic disk devices). Interconnecting the host computers and the logical volumes is the disk drive controller 25. Disk drive controller 25 receives memory commands, e.g., read and write commands, from host computers 712 over a bus 719, which may operate, for example, in accordance with a Small Computer System Interface (SCSI) protocol or a Fibre Channel (FC) protocol. Disk drive controller 25 includes a processor 721 serving as the CPU for executing computer instructions of program code. The computer instructions are stored in a memory 723 (e.g., EEPROM) connected to processor 721 via an internal bus 725. Processor 721 may also interact with another local memory 777 that stores data structures as described below. Disk drive controller 25 delivers data associated with memory commands to or from an appropriate one of logical volumes 716a, 716b, . . . 716n over a second bus 720 which, for example, operates in accordance with a SCSI or FC protocol.

In a typical configuration, controller 25 is also connected to a console computer 722 through a connecting bus 724. Console PC 722 is used for maintenance and access to the controller and can be employed to set parameters of and/or to initiate maintenance commands to the controller, under user control, as described below.

Each host controller 21 (FIG. 1) may have an internal computing architecture similar to that of disk controller 25.

In general, system 14 may have some or all of the characteristics of one or more storage systems described in U.S. Pat. No. 6,161,216, which is incorporated by reference.

With reference to FIG. 2, each controller operates under program control in accordance with software 110 (which may be called "microcode", and which may be or include firmware) stored in a memory such as memory 723. It is desirable to analyze the performance of software 110 during execution. One analysis technique ("Event Trace") provides for tracing a particular event during execution. It has been recognized that Event Trace slows down the system and cannot provide sufficiently accurate profiling information. In Event Trace, the points in the program code that are traced must be determined when the program code is created. A variation of the Event Trace, named Dynamic Trace, provides for runtime selection of points to be traced, but the number of selectable point is limited (e.g., to 16). Selection of such points requires the programmer to hypothesize about the program execution path. Another analysis technique ("Code Trace") allows for tracing small portions of the code at the instruction level, which can be excessively intrusive and detrimental to system performance, and cannot be used for monitoring execution behavior.

The Profiler system described below provides a software analysis technique that executes in an efficient manner with little or no change to the overall performance of the system. The profiler can cause profiler logic to be exercised before and after a designated software function is executed, so that analysis information can be recorded pertaining to the execution of the software function.

In a specific embodiment, the Profiler program code resides in the program memory 723 of the controller and is executed on the CPU of the controller. As described below, data structures used by the Profiler include a stack 130 (FIG. 2) named "PROFILER STACK" having frames such as frame "T_SYMPROF_STACK_FRAME" (FIG. 5) and a table 150 (FIG. 2) named "STATS" having entries such as entry "T_SYMPROF_TABLE_ENTRY" (FIG. 4). (FIG. 3 illustrates examples of related global definitions.)

Software logic in the Profiler that interacts with stack 130 and table 150 includes several software routines described below (see FIG. 6): "_mcount", "profiler_entry", "_mcount_exit", and "profiler_exit". Routines "_profiler_entry" and "_profiler_exit" update table 150 statistics for a function. Routine "_mcount" determines whether the profiler is enabled, and is able to modify stack 130 to control the flow of program execution in accordance with the Profiler.

In a specific embodiment, a compiler causes generation of processor executable code ("machine code") in a function header to be executed when the Profiler is disabled. The function header's machine code includes a branch instruction that skips some Profiler data embedded in the function header. The Profiler is enabled by replacing the branch instruction with a call to "_mcount" as described below. The replacement is performed at the direction of the user communicating with the CPU over a link such as a serial or Ethernet link.

Each software function to be analyzed has an entry in the STATS table 150. In a specific implementation described below, the STATS table includes data for at least several different statistics including total execution time for a parent function including execution of calls made from the parent function to the parent function's child functions, and execution time for the parent function alone ("self-time").

In the specific implementation described below, the PROFILER STACK stack 130 includes information for each profiled function currently executing. The information includes an index into the STATS table 150 for the function, an absolute entry time, an absolute re-entry time (e.g., for when the function is re-entered after execution of a child function is completed), and self-time.

Figure 6:
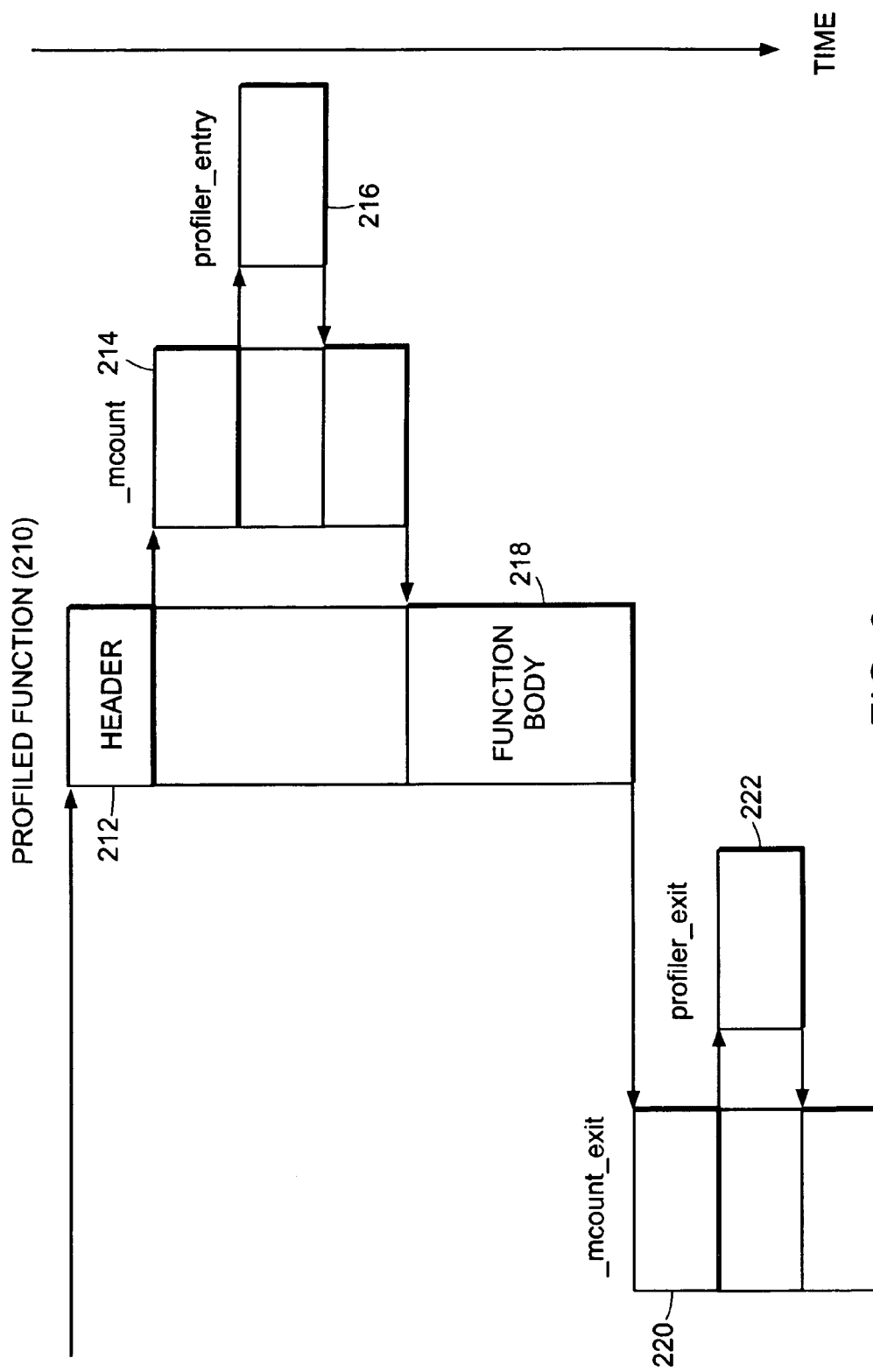

FIG. 6 shows the flow of the execution of routines in a specific embodiment. When a profiled function 210 is to be executed, a header 212 is executed, which causes execution of the "_mcount" routine 214, which causes the "profiler_entry" routine 216 to be executed. Control is returned to the "_mcount" routine, and then the body 218 of the profiled function is executed. Upon exit from the profiled function, the "_mcount_exit" routine 220 is executed, which causes execution of the "profiler_exit" routine 222 and a return to the caller of the profiled function.

FIG. 4 illustrates an example of a structure of an entry 310 in table 150. For the corresponding profiled function, the entry has a function address field 312, a self time field 314, a total time field 316, a number of calls field 318, and a Profiler instruction address field 320. Function address field 312 holds the memory address of the first instruction in the profiled function. The self time field 314 holds data indicating the execution time for the profiled function without the execution times for its child functions, if any. The total time field 316 holds data indicating the execution time for the profiled function together with the execution times for its child functions, if any. The number of calls field 318 holds data indicating the number of times the profiled function has been called and executed. The Profiler instruction address field 320 is used for turning profiling on/off for this function.

Figure 5:
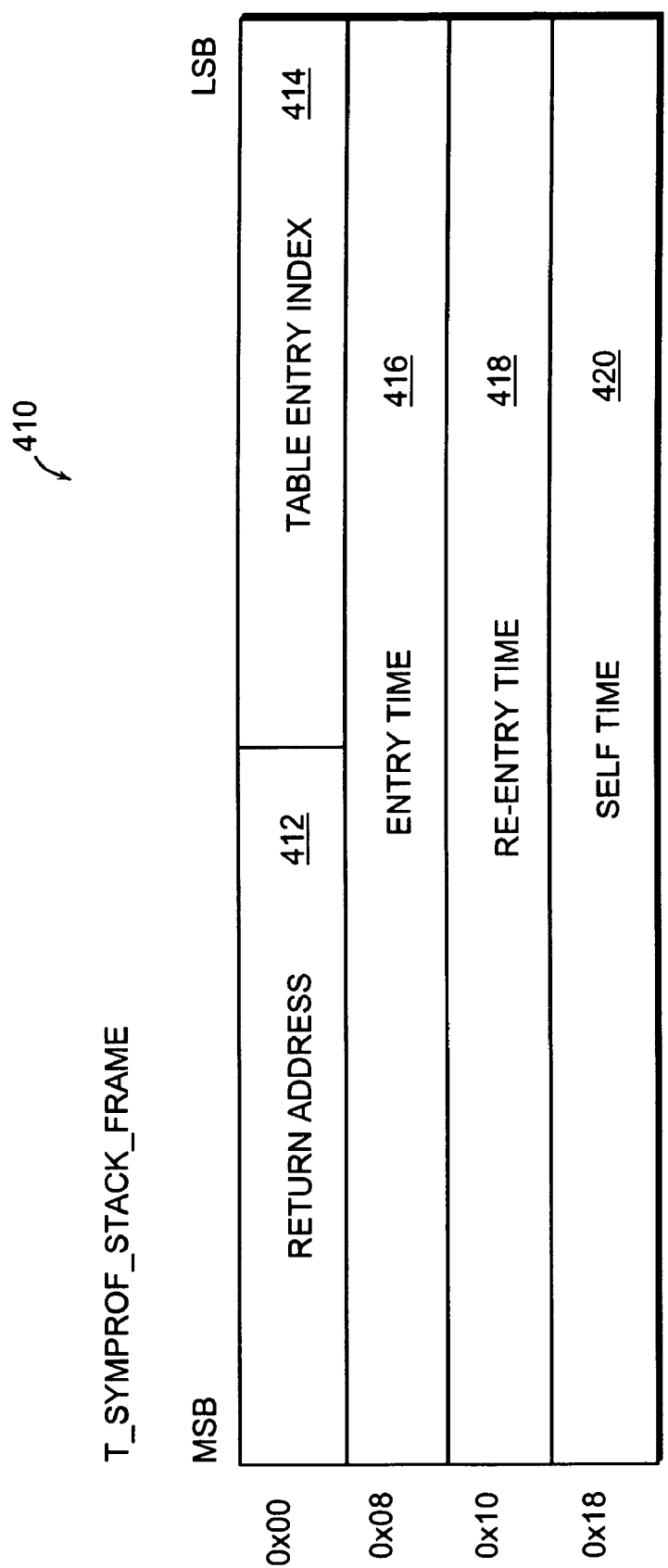

FIG. 5 illustrates an example of a structure of an entry 410 in stack 130. For the corresponding profiled function, the entry has a return address field 412, a table entry index field 414, an entry time field 416, a re-entry time field 418, and a self time field 420. The return address field 412 holds the instruction address to which control is expected to be returned after the profiled function is executed and is used as described below. The table entry index field 414 holds a pointer to the entry in table 150 for the corresponding profiled function. The entry time field 416 holds data indicating the time that the profiled function was called. The re-entry time field 418 holds data indicating the time that control was returned to the profiled function after execution of a child function of the profiled function. The self time field 420 holds data indicating the execution time for the profiled function without the execution times for its child functions, if any. The contents of fields 416, 418, 420 are used as described below in calculations of the self time and total time described above.

Figures 7, 7A:
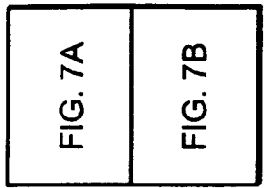

FIG. 7 illustrates an example showing program code that is included in header 212. The top of FIG. 7 lists original program code before Profiler has been added. The bottom of FIG. 7 lists enhanced program code that includes Profiler code 510. An arrow having accompanying comment 'Replaced by "bla _mcount" when Profiler enabled' indicates an instruction location that controls whether the Profiler is enabled. When the location holds instruction "b .+8" as shown in FIG. 7, the Profiler is not enabled, because instruction "b .+8" causes program execution to skip the rest of the header code (the ".long .LPO"

instruction), and resume execution with instruction "mr %r31, %r3", which is the first instruction following the Profiler header code.

When "b .+8" is replaced by "bla _mcount", profiling is enabled and the Profiler is called and executed.

Figure 11:
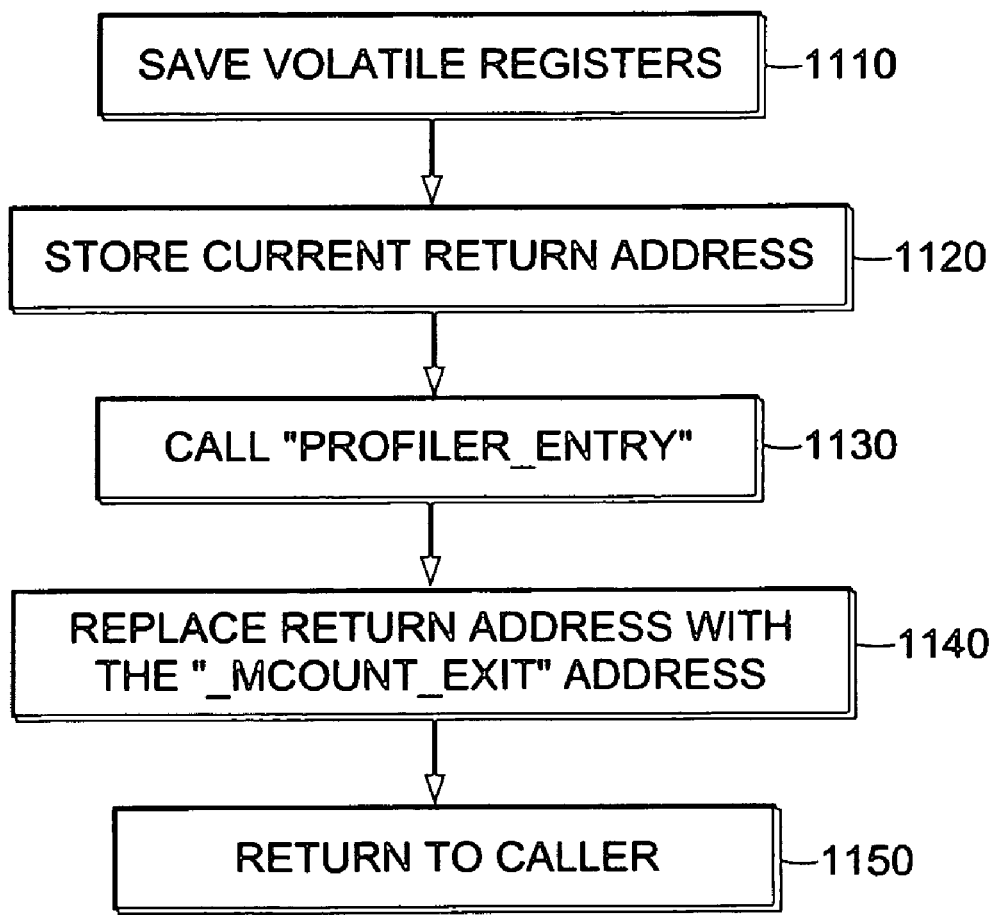

In a specific implementation, the "_mcount" routine 214 executes as follows (FIG. 11). All volatile registers are saved (step 1110). A current return address is stored in stack 130 (step 1120). The "profiler_entry" routine 216 is called, with parameters "index" and a pointer to additional parameters (step 1130). Parameter "index" indicates the location, in table 150, of an entry corresponding to the profiled function. The return address of the caller of the "_mcount" routine 214 is replaced with the address of the "_mcount_exit" routine 220 (step 1140). Program execution is returned to the caller of the "_mcount" routine 214 (step 1150).

Thus, according to the specific implementation above, return addresses are manipulated so that the profiled function is called by the "profiler_entry" routine 216 and the "_mcount_exit" routine 220 is executed on the return from execution of body 218.

Figures 7B, 8:
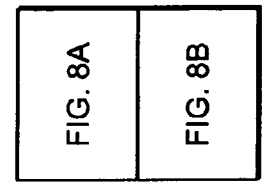

FIG. 8 illustrates an example showing program code that is included in the "profiler_entry" routine 216, which code executes as follows (FIG. 12). A value representing the current time is recorded (step 1210). A check is performed to determine whether Profiler operation should terminate due to expiration of a pre-set timer (step 1220). A timer is started for the profiled function (i.e., for the "self" time) (step 1230), and a timer keeping track of the total self time is reset (step 1240). The stack index for the profiled function is set (step 1250). The timer for the profiled function's parent function (if any) is halted (step 1260). A number-of calls counter is incremented to update the number of times that the profiled function has been called (step 1270). The self stack frame is pushed onto the profiler stack (step 1280). The profiled function's address and parameters are recorded, if "trace" mode is in effect (step 1290).

Figure 13:
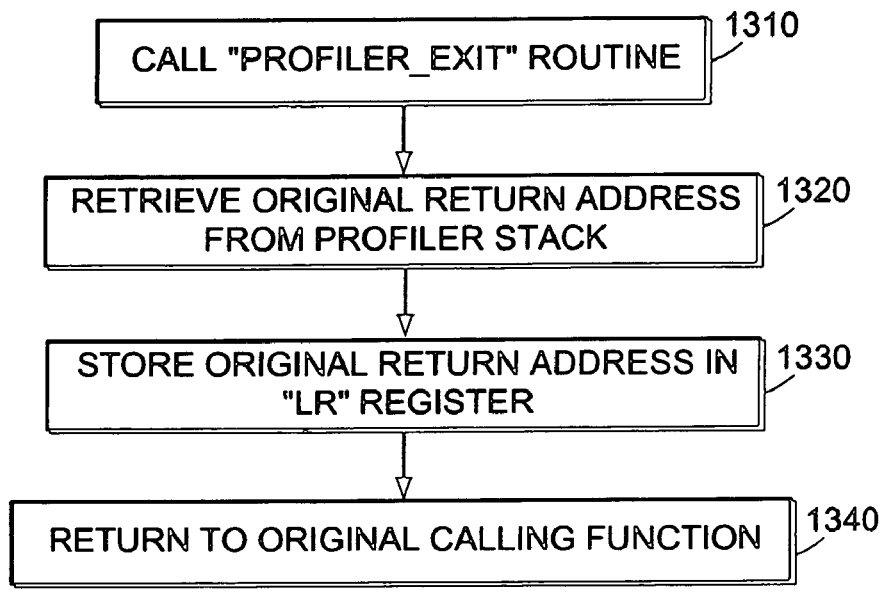

In a specific implementation, the "_mcount_exit" routine executes as follows (FIG. 13). The "profiler_exit" routine is called (step 1310). The original return address is retrieved from the Profiler stack (step 1320). The original return address is stored in an "LR" register (step 1330). Control is returned to the original calling function (step 1340).

Figure 14:
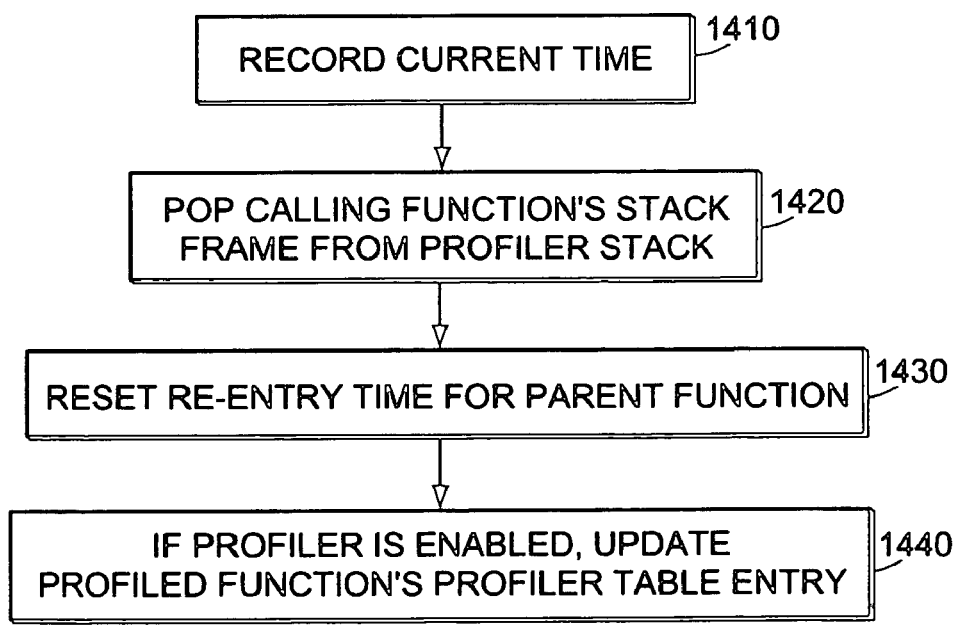

FIG. 9 illustrates an example showing program code that is included in the "profiler_exit" routine 222, which code executes as follows (FIG. 14). A value representing the current time is recorded (step 1410). The calling function's stack frame is popped from the Profiler stack (step 1420). The re-entry time for the parent function is reset (step 1430). If the Profiler is enabled, the profiled function's Profiler table entry is updated (step 1440).

Figure 10:
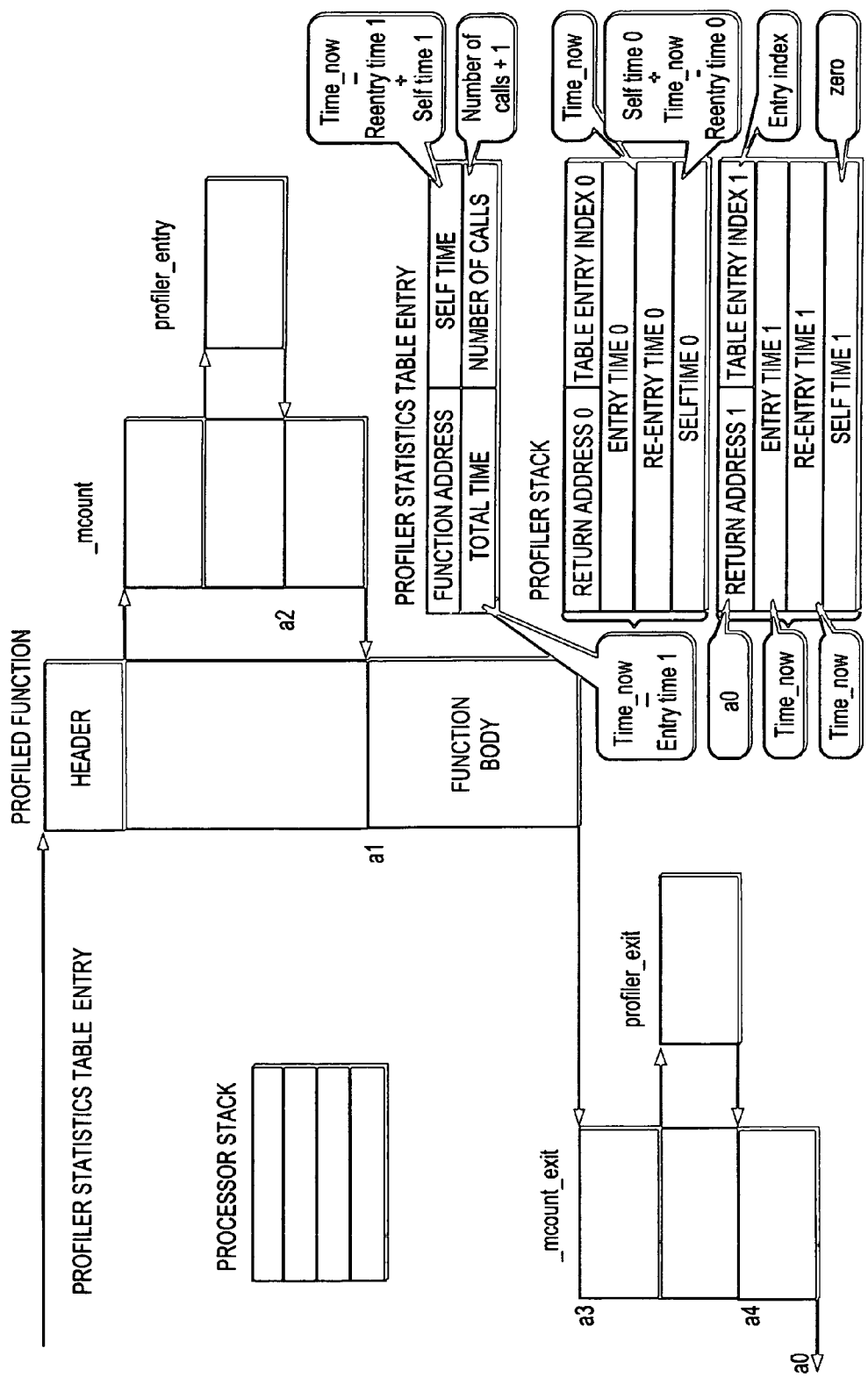

FIG. 10 illustrates a detailed example of Profiler data structures in use as described above. The return address is address "a0". The address of the profiled function's function body is address "a1". The address of the return point into the "_mcount" routine from the "profiler_entry" routine is address "a2". The address of the "_mcount_exit" routine is address "a3". The address of the return point into the "_mcount_exit" routine from the "profiler_exit" routine is address "a4". The Profiler stack holds address "a0".

Figure 15:
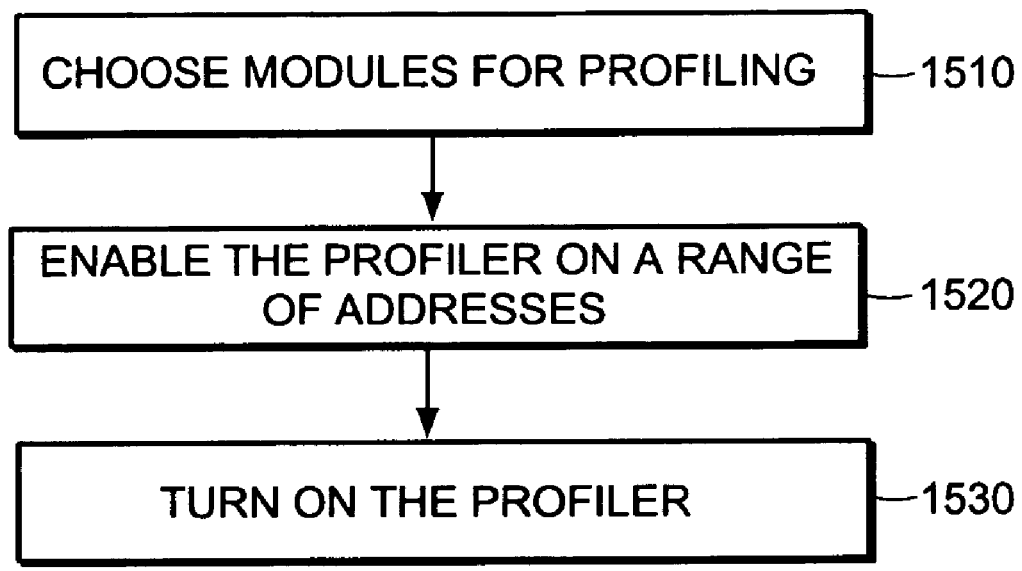
Figure 21:
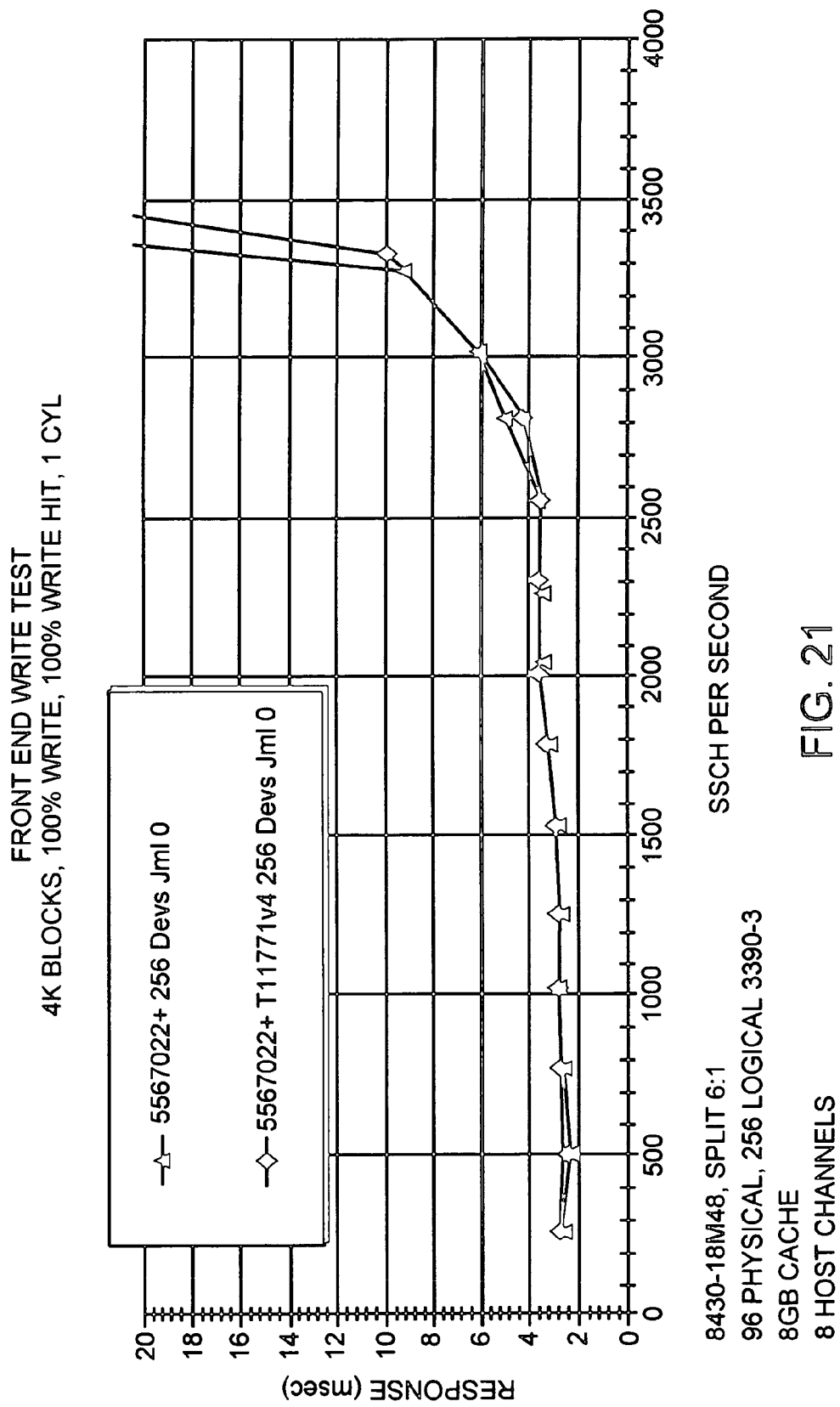
FIGS. 21–28 are illustrations of test data of the systems of FIGS. 1–2.
Figure 22:
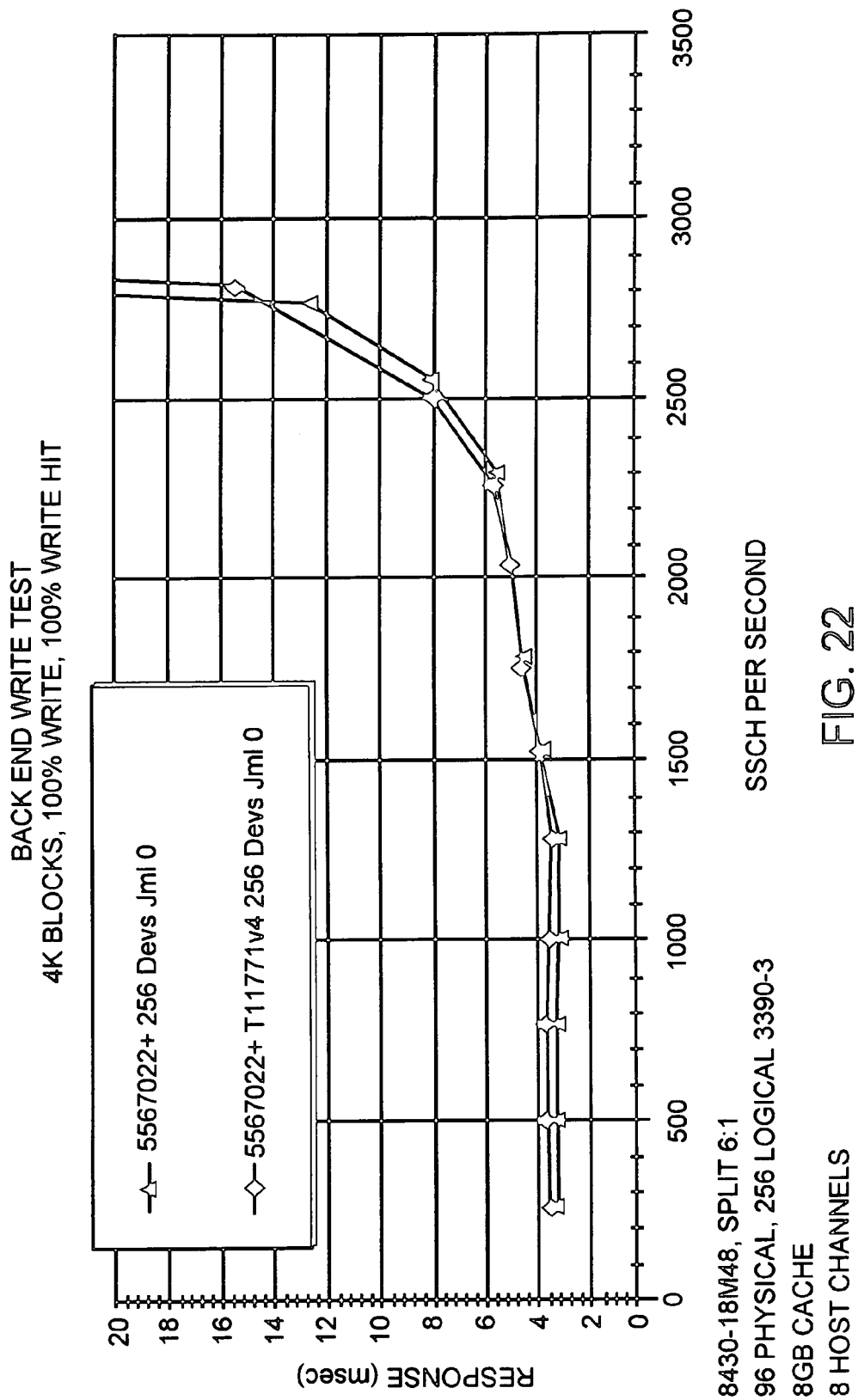
Figure 23:
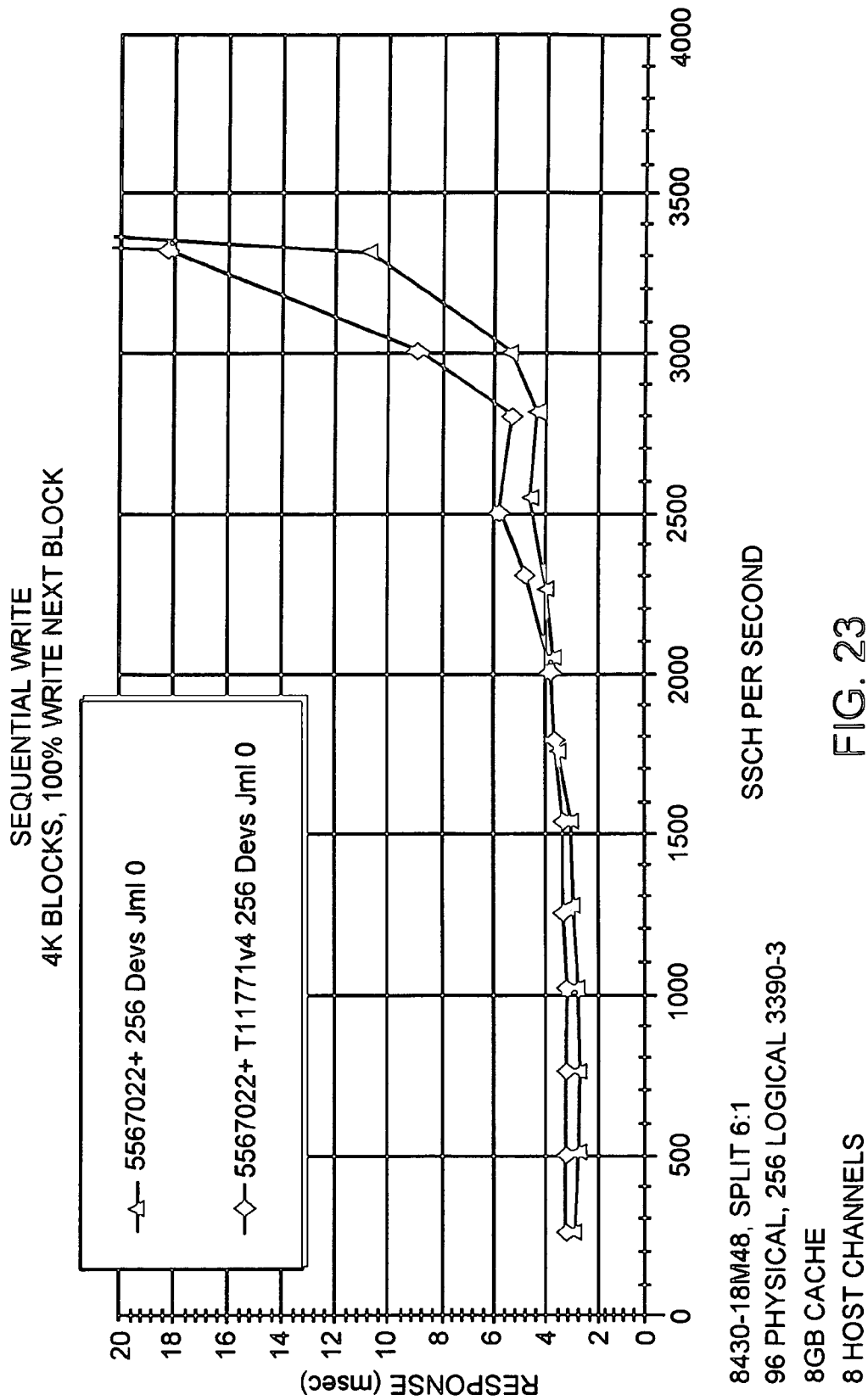
Figure 24:
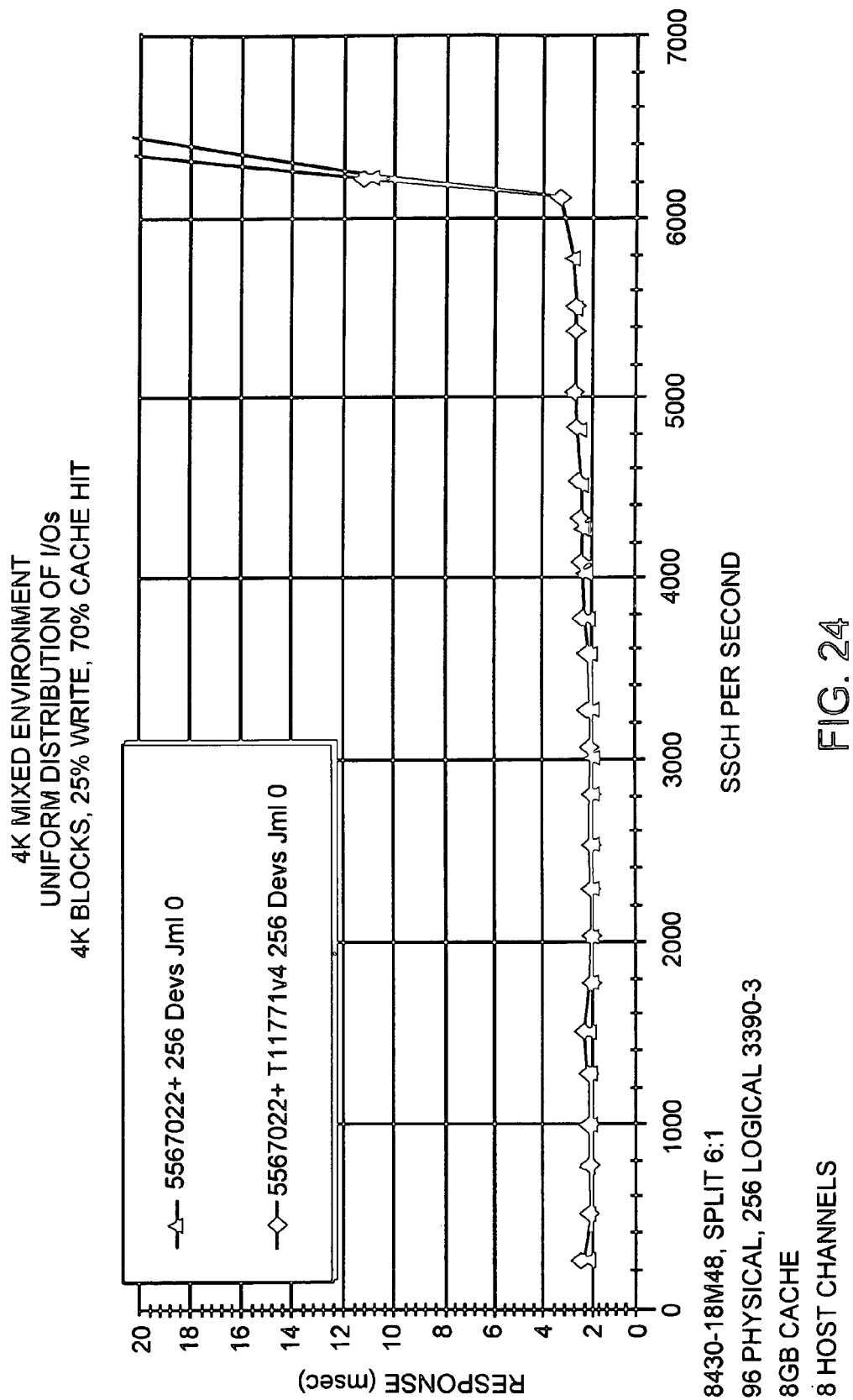
Figure 25:
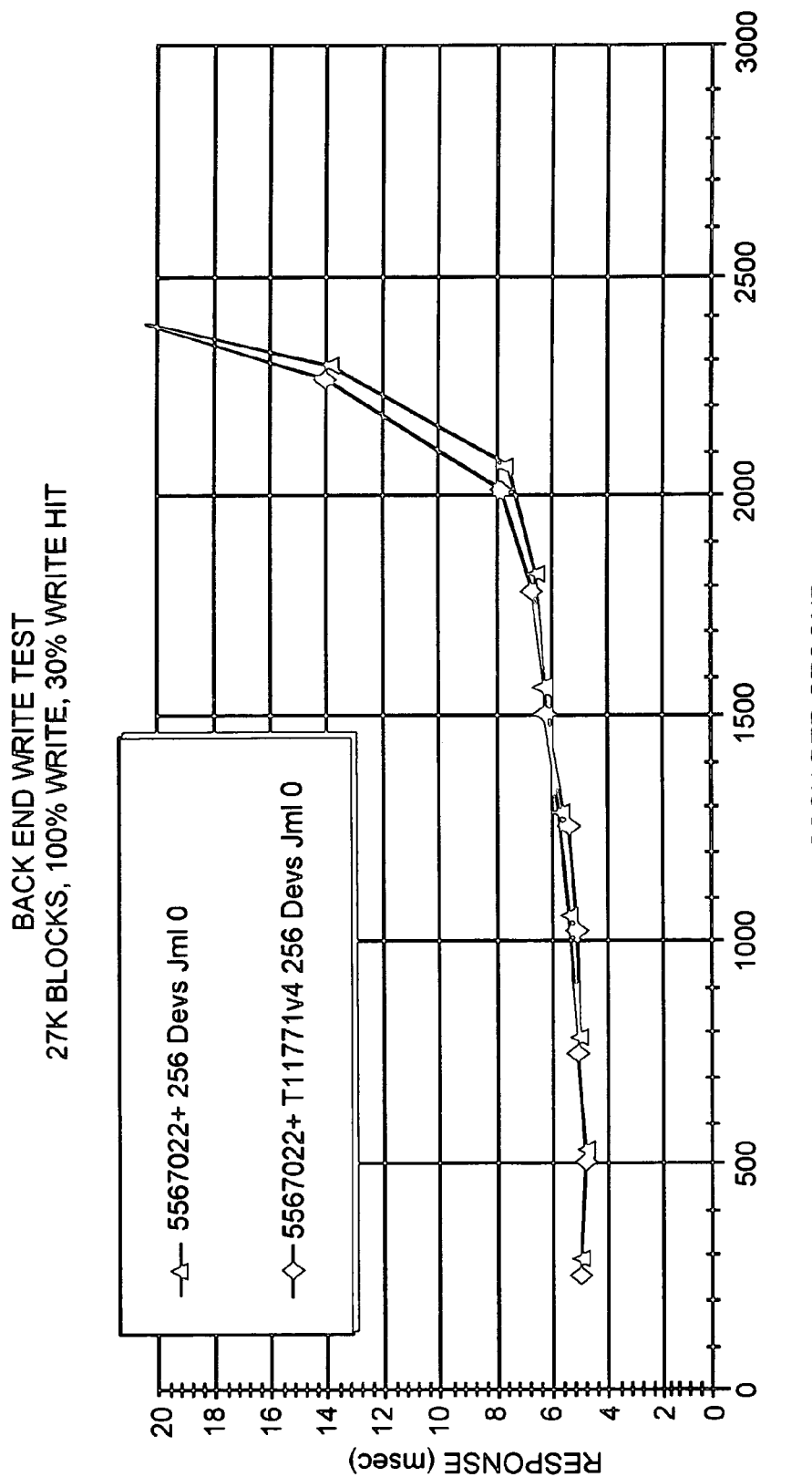
Figure 26:
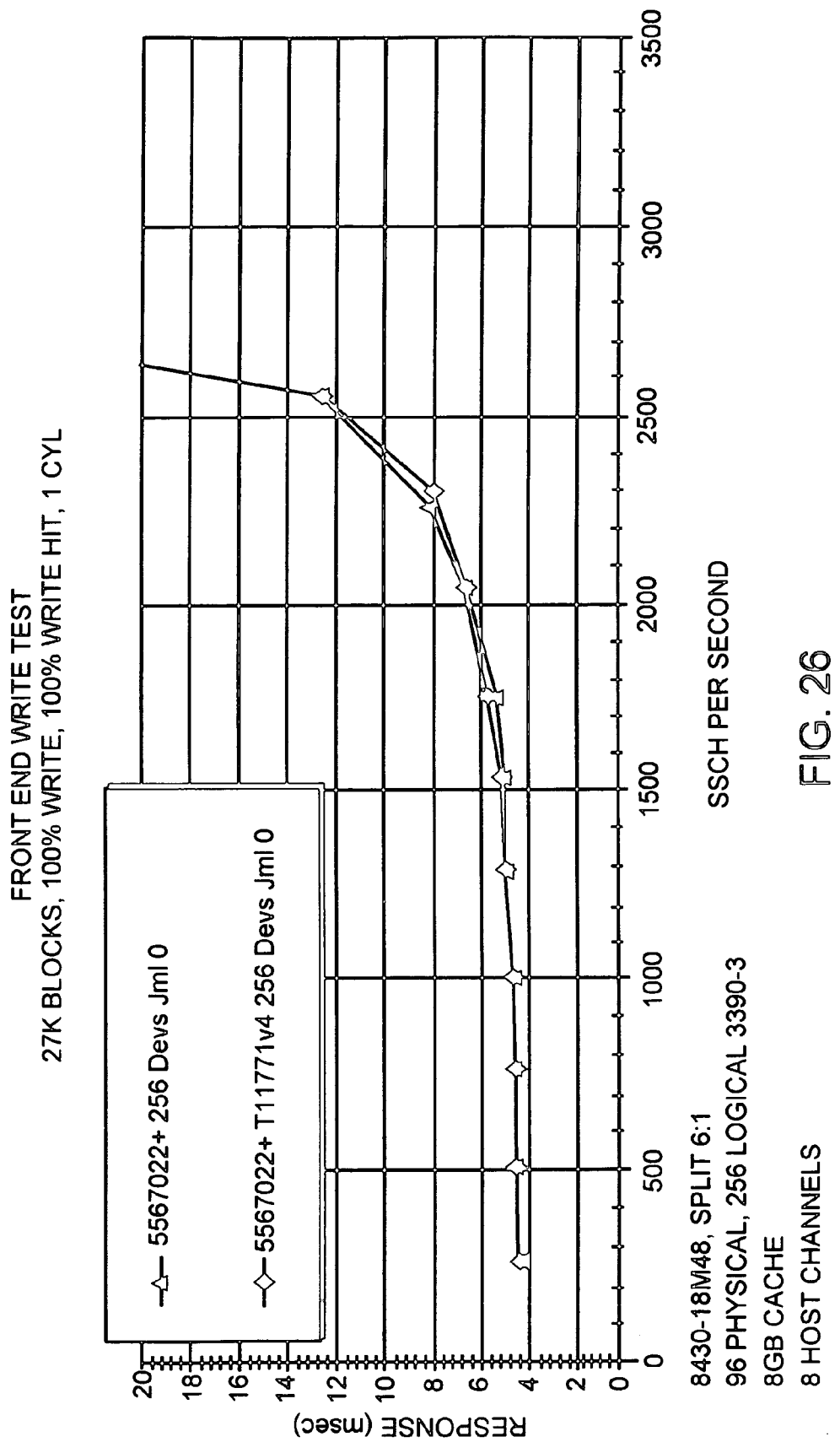
Figure 27:
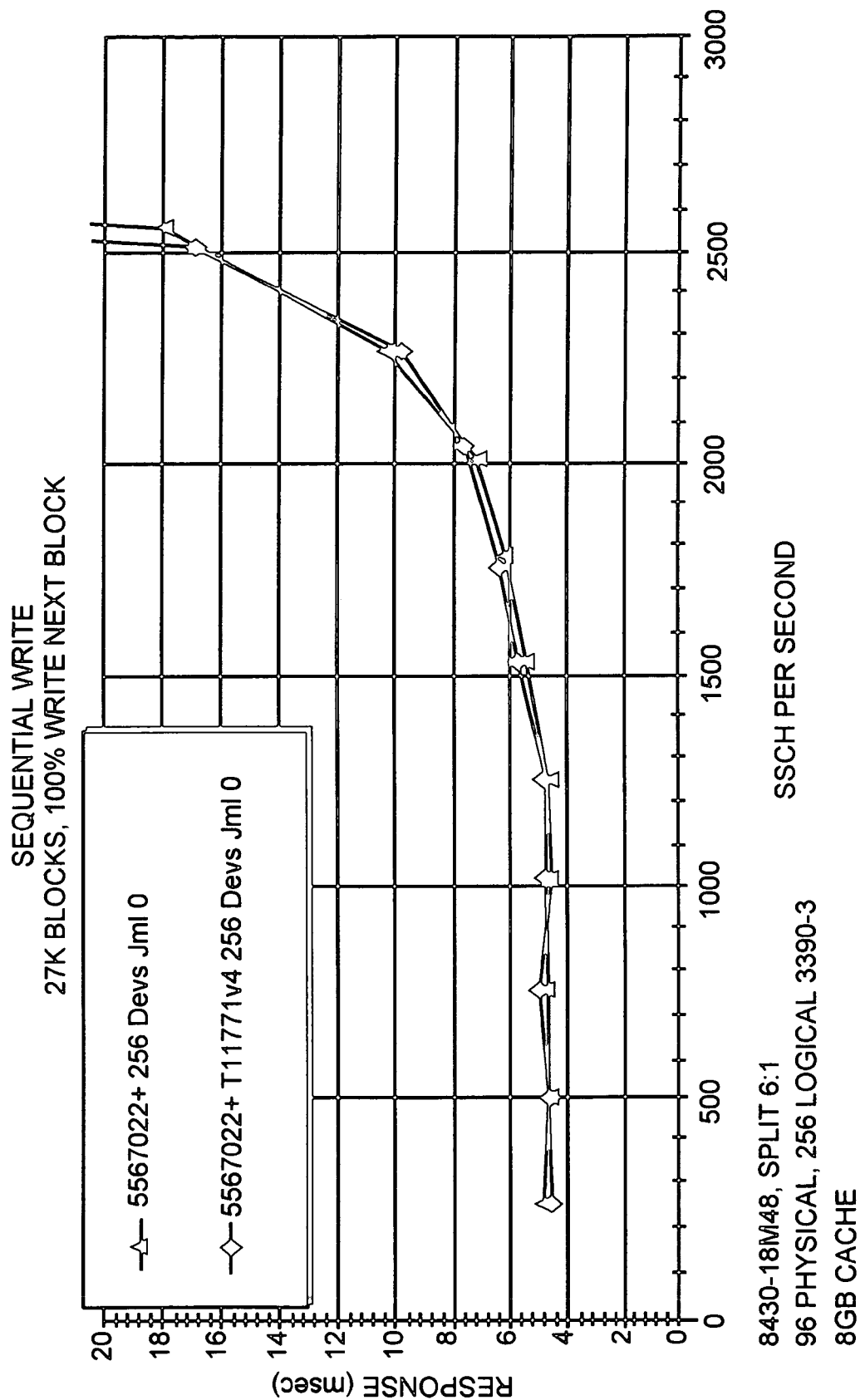
Figure 28:
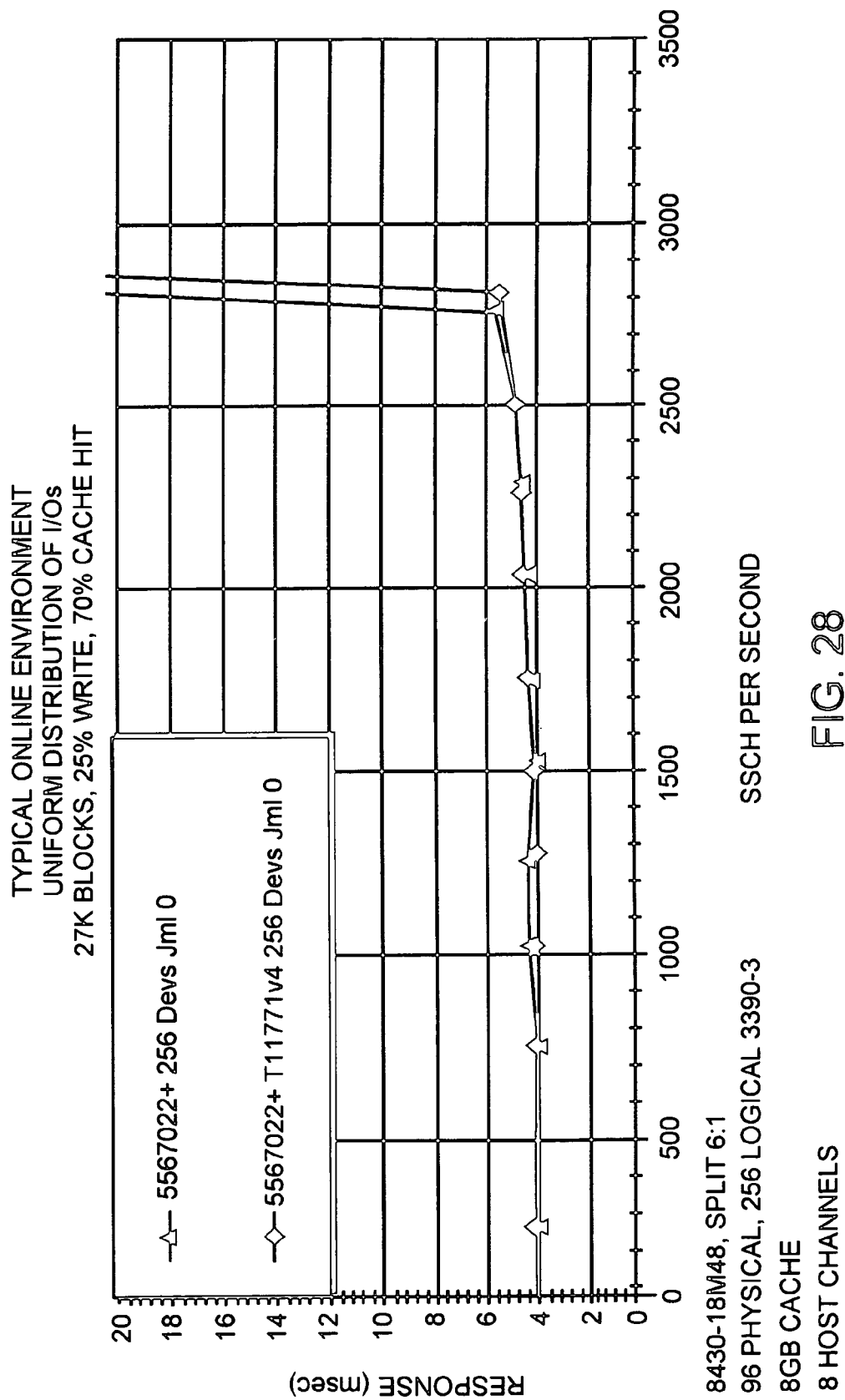

In a specific embodiment, the Profiler is used in three general steps, as follows (FIG. 15). In the first general step, modules are chosen for profiling as now described (step 1510). (In at least some cases, a module with high-level functions is a good candidate.) An emulation is selected. A Profiler compilation option is added to the Makefile entry for the selected module. Listed below is an example showing, in the first line below, a Makefile line lacking the Profiler compilation option, and, in the second line below, a Makefile line having the Profiler compilation option (the points of difference are underlined).

Override modules_r50f+=fastrax_restore.c,:$(code)=cs2; ((data)=.data;$(bss)=.bss Override modules_r50f+=fastrax_restore.c,$(profopts):$ (code)=cs2;((data)=.data;$(bss)=.bss In another embodiment, a "make add_module" procedure may include an explicit profiling option.

In the second general step (step 1520), the Profiler is enabled on one or more address ranges as now described. One or more ranges of addresses are selected to profile (e.g., the entire program code). An "83,def,1,<start>,<end>" utility is invoked (as shown in FIG. 16B as described below). In particular, a "b .+8" instruction is replaced by a "bla _mcount" instruction as described above, in all of the profiled functions' entries. An "83,d,<ranges bitmap>" utility is used (also as shown in FIG. 16B as described below) to disable profiling for ranges of addresses where profiling was previously enabled but currently is not desired.

In the third general step, the Profiler is turned on as now described (step 1530). An ""83,1, <mode>,<time>"" utility is used (as shown in FIG. 16C as described below) to initiate execution of profiling. The "<time>" parameter, which is optional, can be used to cause the profiling to end after a specified amount of time (e.g., a number of seconds) has elapsed. Other utilities "83,A", "83,CA", and "83,0" are used. The "83,A" utility is used to report the status of the Profiler. The "83,CA" utility is used to clear existing statistics. The "83,0" utility is used to stop the execution of profiling.

FIG. 16A illustrates a result of invoking an "83,HELP" utility, which displays a Help main menu. FIGS. 16B–16D illustrate a setup help screen, an execution help screen, and a display help screen, respectively. FIG. 17 illustrates a result of invoking the "83,1,PROF" utility which initiates execution of profiling. FIG. 18 illustrates a result of invoking the "83,0" utility which stops execution of profiling. FIGS. 19A–19G illustrate a results of invoking an "83,A" utility which displays profiling statistics, including, for each of several profiled functions, the address of the function, the number of times the function has been called, the amount of time elapsed during execution of the function, by itself and including its child functions, and corresponding averages. FIG. 20 illustrates a result of invoking an "83,A,,,SELF, DESC" utility which is a variation of the "83,A" utility, to cause profiling statistics to be displayed in a ranking by field (e.g., "self").

FIGS. 21–28 illustrate results of tests performed for an analysis of the performance impact of an example implementation of the Profiler. In particular, FIGS. 21–24 illustrate results produced in the case of 4 kilobyte data blocks with program code having embedded but disabled profiler code, and FIGS. 25–28 illustrate results produced in the case of 27 kilobyte data blocks with program code having embedded but disabled profiler code. As shown by the little or no difference between the curves labeled "5567022+256 Devs Jml 0" and "5567022+T11771 v4 256 Devs Jml 0", which represent non profiling and profiling versions of the program code, respectively.

The technique (i.e., one or more of the procedures described above) may be implemented in hardware or software, or a combination of both. In at least some cases, it is advantageous if the technique is implemented in computer programs executing on one or more programmable computers, such as a computer running or able to run MICROSOFT WINDOWS 95, 98, 2000, MILLENNIUM EDITION, NT; UNIX; LINUX; OR MACOS operating systems; that each include a processor such as an INTEL PENTIUM 4 processor, a storage medium readable by the processor (including volatile and non-volatile memory and/or storage elements), at least one input device such as a keyboard, and at least one output device. Program code is applied to data entered using the input device to perform the method described above and to generate output information. The output information is applied to one or more output devices such as a display screen of the computer.

In at least some cases, it is advantageous if such program is implemented in a high level procedural or object-oriented programming language such as C++, JAVA, or PERL languages to communicate with a computer system. However, the programs can be implemented in assembly or machine language, if desired. In any case, the language may be a complied or interpreted language.

In at least some cases, it is advantageous if each such computer program is stored on a storage medium or device, such as ROM or magnetic diskette, that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the invention, and may include one or more of the following features. A warning may be traced if it is detected that excessive time elapses during execution of a function. One or more functions may be traced to build a dependency tree for subsequent use or analysis. Checks may be inserted during profiling, e.g., to log an error if a single function is found to have taken an excessive amount of time (e.g., seconds or minutes) to complete. One or more run time actions can be performed, such as checking stack utilization and issuing an error when the stack becomes full, and checking other dynamic data structures such as the heap.

What is claimed is:

1. A method for use in analyzing software behavior, comprising:
   in a disk drive controller having a processor executing computer software stored in a memory communicating with the processor via a local bus, identifying computer executable program code that includes a set of computer executable program instructions for recording analytical data for at least a subset of the computer executable program code, the set of computer executable program instructions being disabled from executing; and
   without halting execution of the computer executable program code, enabling execution of the set of computer executable program instructions.

2. The method of claim 1, further comprising
   identifying an instruction in the computer executable program code that disables the set of computer executable program instructions from executing; and
   causing a change to the computer executable program code to counter the effect of the instruction.

3. The method of claim 2, further comprising
   removing the instruction from the computer executable program code.

4. The method of claim 1, wherein the computer executable program code is arranged to cause execution of the computer executable program code to bypass the set of computer executable program instructions.

5. The method of claim 1, further comprising
   identifying a second set of computer executable program instructions wherein the second set of computer executable program instructions is for recording analytical data for a second set of the computer executable program code, the second set including all or a portion of the computer executable program code, the second set of computer executable program instructions being disabled from executing; and
   causing execution of one of the sets of computer executable program instructions to be enabled concurrently with execution of the other of the sets of computer executable program instructions being disabled.

6. The method of claim 5, wherein one of the sets of computer executable program instructions records analytical data for a parent function of a child function for which the other of the sets of computer executable program instructions records analytical data.

7. The method of claim 1, further comprising
   accepting an address range for the at least a subset of the computer executable program code.

8. The method of claim 1, wherein the set of computer executable program instructions is arranged to record analytical data indicating a start time for an instance of execution of the at least a subset of the computer executable program code.

9. The method of claim 1, wherein the set of computer executable program instructions is arranged to record analytical data indicating an end time for an instance of execution of the at least a subset of the computer executable program code.

10. The method of claim 1, wherein the set of computer executable program instructions is arranged to calculate derivative analytical data during execution of the at least a subset of the computer executable program code.

11. The method of claim 1, further comprising
    receiving a request to enable execution of the set of computer executable program instructions.

12. The method of claim 1, wherein the set of computer executable program instructions is arranged to interact with a data structure having an entry time field.

13. The method of claim 1, wherein the set of computer executable program instructions is arranged to interact with a data structure having a return address field.

14. The method of claim 1, wherein the set of computer executable program instructions is arranged to interact with a data structure having a re-entry time field.

15. The method of claim 1, wherein the set of computer executable program instructions is arranged to interact with a data structure having a self time field.

16. The method of claim 1, wherein the set of computer executable program instructions is arranged to interact with a data structure having a number of calls field.

17. The method of claim 1, wherein the set of computer executable program instructions is arranged to interact with a data structure having a function address field.

18. A method for use in analyzing software behavior, comprising:
    in a disk drive controller having a processor executing computer software stored in a memory communicating with the processor via a local bus, identifying analytical software for recording analytical data of software execution, and identifying software source code that does not include the analytical software;

deriving computer executable program code from the software source code and the analytical software, the computer executable program code including computer executable instructions for recording analytical data for at least a subset of the computer executable program code, the computer executable instructions being inactive and being capable of being activated during execution of the computer executable program code.

19. The method of claim 18, wherein the computer executable program code is arranged to cause execution of the computer executable program code to bypass the computer executable instructions for recording analytical data for at least a subset of the computer executable program code.

20. Apparatus for use in analyzing software behavior, comprising:

means for, in a disk drive controller having a processor executing computer software stored in a memory communicating with the processor via a local bus, identifying computer executable program code that includes a set of computer executable program instructions for recording analytical data for at least a subset of the computer executable program code, the set of computer executable program instructions being disabled from executing; and means for, without halting execution of the computer executable program code, enabling execution of the set of computer executable program instructions.

21. Apparatus for use in analyzing software behavior, comprising:

means for, in a disk drive controller having a processor executing computer software stored in a memory communicating with the processor via a local bus, identifying analytical software for recording analytical data of software execution, and identifying software source code that does not include the analytical software;

means for deriving computer executable program code from the software source code and the analytical software, the computer executable program code including computer executable instructions for recording analytical data for at least a subset of the computer executable program code, the computer executable instructions being inactive and being capable of being activated during execution of the computer executable program code.

22. A system for use in analyzing software behavior, comprising:

in a disk drive controller having a processor executing computer software stored in a memory communicating with the processor via a local bus, an identifier identifying computer executable program code that includes a set of computer executable program instructions for recording analytical data for at least a subset of the computer executable program code, the set of computer executable program instructions being disabled from executing; and an enabler enabling, without halting execution of the computer executable program code, execution of the set of computer executable program instructions.

23. A system for use in analyzing software behavior, comprising:

in a disk drive controller having a processor executing computer software stored in a memory communicating with the processor via a local bus, an identifier identifying analytical software for recording analytical data of software execution, and identifying software source code that does not include the analytical software;

a deriver deriving computer executable program code from the software source code and the analytical software, the computer executable program code including computer executable instructions for recording analytical data for at least a subset of the computer executable program code, the computer executable instructions being inactive and being capable of being activated during execution of the computer executable program code.

24. Computer software, residing on a computer-readable storage medium, comprising a set of instructions for use in a computer system to help cause the computer system to analyze software behavior, the set of instructions causing the computer system to:

in the computer system, in a disk drive controller having a processor executing computer software stored in a memory communicating with the processor via a local bus, identify computer executable program code that includes a set of computer executable program instructions for recording analytical data for at least a subset of the computer executable program code, the set of computer executable program instructions being disabled from executing; and without halting execution of the computer executable program code, enable execution of the set of computer executable program instructions.

25. Computer software, residing on a computer-readable storage medium, comprising a set of instructions for use in a computer system to help cause the computer system to analyze software behavior, the set of instructions causing the computer system to:

in a disk drive controller having a processor executing computer software stored in a memory communicating with the processor via a local bus, identify analytical software for recording analytical data of software execution, and identify software source code that does not include the analytical software;

in the computer system, derive computer executable program code from the software source code and the analytical software, the computer executable program code including computer executable instructions for recording analytical data for at least a subset of the computer executable program code, the computer executable instructions being inactive and being capable of being activated during execution of the computer executable program code.

26. A method for use in analyzing software behavior, comprising:

in a disk drive controller having a processor executing computer software stored in a memory communicating with the processor via a local bus, identifying computer executable program code that includes at least one computer executable program instruction causing execution of analytical program instructions to be avoided, the analytical program instructions causing recording of analytical data for at least a subset of the computer executable program code; and without halting execution of the computer executable program code, performing a change directed to the at least one computer executable program instruction to allow execution of the analytical program instructions.

27. The method of claim 26, further comprising performing the change in response to user input.

28. The method of claim 26, wherein the at least one computer executable program instruction is included in a function header of the computer executable program code.

29. The method of claim 26, wherein the at least one computer executable program instruction includes a branch instruction.

30. The method of claim 26, further comprising removing the at least one computer executable program instruction; and inserting at least one new program instruction that specifies a call to the analytical program instructions.

31. Apparatus for use in analyzing software behavior, comprising:

means for, in a disk drive controller having a processor executing computer software stored in a memory communicating with the processor via a local bus, identifying computer executable program code that includes at least one computer executable program instruction causing execution of analytical program instructions to be avoided, the analytical program instructions causing recording of analytical data for at least a subset of the computer executable program code; and means for, without halting execution of the computer executable program code, performing a change directed to the at least one computer executable program instruction to allow execution of the analytical program instructions.

32. A system for use in analyzing software behavior, comprising:

an identifier identifying, in a disk drive controller having a processor executing computer software stored in a memory communicating with the processor via a local bus, computer executable program code that includes at least one computer executable program instruction causing execution of analytical program instructions to be avoided, the analytical program instructions causing recording of analytical data for at least a subset of the computer executable program code; and a performer performing, without halting execution of the computer executable program code, a change directed to the at least one computer executable program instruction to allow execution of the analytical program instructions.

33. Computer software, residing on a computer-readable storage medium, comprising a set of instructions for use in a computer system to help cause the computer system to analyze software behavior, the set of instructions causing the computer system to:

identify, in the computer system, in a disk drive controller having a processor executing computer software stored in a memory communicating with the processor via a local bus, computer executable program code that includes at least one computer executable program instruction causing execution of analytical program instructions to be avoided, the analytical program instructions causing recording of analytical data for at least a subset of the computer executable program code; and perform, without halting execution of the computer executable program code, a change directed to the at least one computer executable program instruction to allow execution of the analytical program instructions.

* * * * *